(12) United States Patent
Bellistri et al.

(10) Patent No.: US 7,798,128 B2
(45) Date of Patent: Sep. 21, 2010

(54) APPARATUS AND PROCESS FOR CONTROLLING OPERATION OF AN INTERNAL COMBUSTION ENGINE HAVING AN ELECTRONIC FUEL REGULATION SYSTEM

(75) Inventors: James T. Bellistri, Wildwood, MO (US); Mazen A. Hajji, Chesterfield, MO (US)

(73) Assignee: PC/RC Products, L.L.C., St. Louis, MO (US)

( * ) Notice: Subject to any disclaimer, the term of this patent is extended or adjusted under 35 U.S.C. 154(b) by 416 days.

(21) Appl. No.: 10/571,035

(22) PCT Filed: Sep. 9, 2004

(86) PCT No.: PCT/US2004/029454

§ 371 (c)(1),
(2), (4) Date: Jan. 3, 2007

(87) PCT Pub. No.: WO2005/026515

PCT Pub. Date: Mar. 24, 2005

(65) Prior Publication Data

US 2007/0256668 A1    Nov. 8, 2007

Related U.S. Application Data

(60) Provisional application No. 60/501,708, filed on Sep. 10, 2003.

(51) Int. Cl.
*F02M 51/00* (2006.01)
*F02D 41/00* (2006.01)
(52) U.S. Cl. .................. 123/478; 123/497
(58) Field of Classification Search ............ 123/478, 123/480, 446, 472, 497
See application file for complete search history.

(56) References Cited

U.S. PATENT DOCUMENTS

| 3,828,754 | A |   | 8/1974  | Carlsson        |         |
|-----------|---|---|---------|-----------------|---------|
| 4,112,901 | A | * | 9/1978  | Chapin et al.   | 123/505 |
| 4,123,901 | A |   | 11/1978 | Masaki et al.   |         |
| 4,132,203 | A | * | 1/1979  | Elpern et al.   | 123/472 |
| 4,160,435 | A |   | 7/1979  | Sleder          |         |
| 4,197,996 | A | * | 4/1980  | Giardini        | 239/87  |
| 4,235,375 | A |   | 11/1980 | Melotti         |         |
| 4,276,602 | A |   | 6/1981  | Obara et al.    |         |
| 4,305,364 | A |   | 12/1981 | Stuckas         |         |
| 4,341,193 | A | * | 7/1982  | Bowler          | 123/472 |
| 4,400,944 | A |   | 8/1983  | Iwamoto et al.  |         |
| 4,422,427 | A |   | 12/1983 | Pinson          |         |
| 4,454,990 | A |   | 6/1984  | Lewis           |         |

(Continued)

*Primary Examiner*—Stephen K Cronin
*Assistant Examiner*—Johnny H Hoang
(74) *Attorney, Agent, or Firm*—Polster Lieder Woodruff & Lucchesi, LC

(57) ABSTRACT

An apparatus and process for controlling an internal combustion engine (C) having an electronic fuel regulation system that provides fuel control for small engines (C) used in garden equipment (B) and small vehicles. An electronic control unit (1) accepts a plurality of signals generated by a plurality of sensors that detect certain environmental characteristics and certain engine operating characteristics. The electronic control unit (1) uses a set of firmware having a number of electronic maps to analyze the plurality of signals to manage operation of a fuel valve (3) and a fuel pump (2) to control the timing and amount of fuel delivered to the cylinder of small internal combustion engine (C) having at least one cylinder.

83 Claims, 11 Drawing Sheets

U.S. PATENT DOCUMENTS

| | | | |
|---|---|---|---|
| 4,526,152 A * | 7/1985 | Hideg et al. | 123/478 |
| 4,625,697 A | 12/1986 | Hosaka | |
| 4,890,593 A | 1/1990 | Goulet | |
| 4,901,701 A | 2/1990 | Chasteen | |
| 4,932,384 A | 6/1990 | Weingartner | |
| 5,031,593 A | 7/1991 | Erhard et al. | |
| 5,050,551 A | 9/1991 | Morikawa | |
| 5,091,858 A * | 2/1992 | Paielli | 701/115 |
| 5,103,791 A | 4/1992 | Tomisawa | |
| 5,278,762 A | 1/1994 | Kawamura | |
| 5,303,168 A | 4/1994 | Cullen et al. | |
| 5,313,924 A * | 5/1994 | Regueiro | 123/456 |
| 5,341,785 A * | 8/1994 | Meaney | 123/452 |
| 5,357,789 A * | 10/1994 | Kuroda et al. | 73/114.02 |
| 5,377,636 A * | 1/1995 | Rix et al. | 123/446 |
| 5,404,855 A * | 4/1995 | Yen et al. | 123/446 |
| 5,419,291 A | 5/1995 | Kimata et al. | |
| 5,460,133 A * | 10/1995 | Perr et al. | 123/446 |
| 5,479,909 A | 1/1996 | Blakeslee et al. | |
| 5,492,098 A * | 2/1996 | Hafner et al. | 123/446 |
| 5,546,908 A | 8/1996 | Stokes | |
| 5,588,415 A | 12/1996 | Ahern | |
| 5,601,068 A | 2/1997 | Nozaki | |
| 5,771,688 A | 6/1998 | Hasegawa et al. | |
| 5,791,304 A | 8/1998 | Taipale | |
| 5,813,386 A | 9/1998 | Okada et al. | |
| 5,813,390 A | 9/1998 | Anamoto | |
| 5,816,221 A | 10/1998 | Krueger | |
| 5,829,247 A | 11/1998 | Zhang | |
| 5,842,459 A | 12/1998 | Akagi et al. | |
| 5,927,248 A | 7/1999 | Lang et al. | |
| 5,929,609 A | 7/1999 | Joy et al. | |
| 5,941,222 A | 8/1999 | Braly | |
| 5,975,058 A | 11/1999 | French et al. | |
| 5,979,412 A | 11/1999 | Werner | |
| 6,000,384 A | 12/1999 | Brown et al. | |
| 6,026,786 A | 2/2000 | Groff et al. | |
| 6,343,596 B1 | 2/2002 | Hajji et al. | |
| 6,453,877 B1 | 9/2002 | Lucier et al. | |
| 6,505,595 B1 | 1/2003 | Koerner | |
| 6,557,509 B1 | 5/2003 | Hall et al. | |
| 6,560,528 B1 | 5/2003 | Gitlin et al. | |
| 6,575,134 B1 | 6/2003 | Bowling | |
| 6,615,801 B1 | 9/2003 | Zdroik | |
| 6,799,559 B2 | 10/2004 | Mieny et al. | |
| 7,156,064 B2 | 1/2007 | Namari et al. | |
| 7,263,978 B2 | 9/2007 | York et al. | |
| 7,311,084 B2 | 12/2007 | Begg | |
| 2003/0209232 A1 | 11/2003 | Hou | |
| 2005/0045157 A1 | 3/2005 | Mieny et al. | |

* cited by examiner

FIG. 9

FUEL DELAY ANGLE

| 290 | 300 | 290 | 290 | 310 | 310 | 330 | 290 | 330 |

(DEGREES)

FIG. 8

CHOKE SETUP

COLD CHOKE SETUP

PRIME CYCLE COUNT: 255
PRIME PULSE DURATION: 127.5

CHOKE DECAY TABLE

| Range | Value |
|---|---|
| 90-99% | 1 |
| 80-89% | 10 |
| 70-79% | 20 |
| 60-69% | 30 |
| 50-59% | 35 |
| 40-49% | 40 |
| 30-39% | 50 |
| 20-29% | 60 |
| 10-19% | 70 |
| 0-9% | 100 |

WARM CHOKE SETUP

PRIME CYCLE COUNT: 255
PRIME PULSE DURATION: 50.0

CHOKE DECAY TABLE

| Range | Value |
|---|---|
| 90-99% | 1 |
| 80-89% | 25 |
| 70-79% | 30 |
| 60-69% | 35 |
| 50-59% | 40 |
| 40-49% | 50 |
| 30-39% | 60 |
| 20-29% | 70 |
| 10-19% | 80 |
| 0-9% | 100 |

HOT CHOKE SETUP

PRIME CYCLE COUNT: 255
PRIME PULSE DURATION: 127.5

CHOKE DECAY TABLE

| Range | Value |
|---|---|
| 90-99% | 20 |
| 80-89% | 20 |
| 70-79% | 33 |
| 60-69% | 60 |
| 50-59% | 80 |
| 40-49% | 85 |
| 30-39% | 90 |
| 20-29% | 100 |
| 10-19% | 100 |
| 0-9% | 100 |

APPARATUS AND PROCESS FOR CONTROLLING OPERATION OF AN INTERNAL COMBUSTION ENGINE HAVING AN ELECTRONIC FUEL REGULATION SYSTEM

CROSS-REFERENCE TO RELATED APPLICATIONS

This application derives and claims priority from U.S. provisional Application No. 60/501,708, filed Sep. 10, 2003.

TECHNICAL FIELD

This invention relates in general to an electronic fuel regulation system, more particularly, to the process of controlling the operation of an engine having an electronic fuel regulation system for small internal combustion engines used on garden implements and motorcycles. While the invention is described in detail with respect to those applications, those skilled in the art will recognize the wider applicability of the inventive aspects described herein.

BACKGROUND ART

Small engines having one or more cylinders and less than twenty-five horsepower are used in a wide variety of applications. These applications range from single cylinder lawn mowers to multi-cylinder engines used on garden implements, portable generators, and motorcycles. Other such engines are used to power refrigeration units for refrigerated transport vehicles such as tractor-trailers. Scooters mopeds, and other types of motorcycles that use this same type of small internal combustion engine are in worldwide use. There are several manufacturers of these smaller engines including, for example, Tecumseh Products Inc. and Briggs and Stratton Corporation, among others.

The standard fuel delivery system for such engines is currently a carburetor-based system. However, such carburetor-based systems are relatively fuel inefficient resulting in undesirable levels of emissions caused by engine operations that generate excess hydrocarbons and evaporative emissions. Additionally, carburetor-based systems usually require high maintenance and are difficult to adjust for maximum efficiency. Carburetor-based systems also can sometimes be very hard to start in certain conditions and are very difficult to operate without generation of high levels of unwanted fuel emissions. In some regions of the world, including some areas of the United States, there is a pressing need for a fuel delivery system that eliminates these unwanted fuel emissions and prevent the steady increase of air pollution in heavily populated areas.

To rectify some of the fundamental problems associated with carburetor-based fuel delivery systems, there have been attempts to design fuel management systems for smaller internal combustion engines. These attempts have usually been fuel injector-based systems. Most of these fuel injection systems are simply scaled down versions of standard automobile fuel injection systems. They normally operate at fuel pressures of about 30-90 psi. Therefore, these systems are usually cost prohibitive in applications of twenty five horsepower and less. Fuel injection systems also not fuel efficient when used with internal combustion engines in that horse power range, and they usually require a large number of expensive and complex components. Fuel injection systems also require a significant amount of electrical energy to operate the components of the systems such as the high pressure fuel pumps. This higher electrical requirement requires a commensurate addition of electrical generating capacity as well as the inclusion of additional electrical generation components associated with such higher capacities. The addition of these electrical generation devices results in a notable reduction in the available horsepower generated by the engine.

To control the fuel delivery and fuel mixture in the previous known fuel injector-based fuel systems, various timing and sensing components must also be added to the engine. For example, toothed gears and other sensing devices for determination of the angle of either the crankshaft or the camshaft are used to ensure that fuel is delivered to a cylinder at just the appropriate time and in just the appropriate amount. These additional components increase the cost of fuel injector-based fuel delivery systems and add to the overall complexity of the systems.

Thus, while previous attempts to design a fuel injection delivery system may have overcome some of the problems associated with carburetor-based fuel delivery systems, current fuel injection systems do so at the cost of requiring a costly and complex system that contains a significant number of components that rob the internal combustion engine of significant amounts of available horsepower.

It is noted that U.S. Pat. No. 6,343,596 (the '596 patent) was issued to the current inventors and is incorporated herein by reference. The '596 patent disclosed and claimed an invention that was the starting point for the conception and development of the present invention. The present invention is a new and unique adaptation and improvement of the invention in the '596 patent. Specifically, the device in the '596 patent was a fuel regulator for use in two-cycle or four-cycle internal combustion engines. The system includes a microprocessor, a thermocouple exhaust gas temperature sensor, and a fuel regulating valve installed in a low-pressure fuel delivery system between the fuel tank and the carburetor. During operation, the microprocessor continually receives signals from the exhaust gas temperature sensor. These signals in the '596 patent are compared with stored temperature ranges to determine the optimum fuel mixture for the current engine operating conditions. If the current engine operating conditions require a variation in the fuel mixture setting, the microprocessor adjusts the degree of opening of the in-line fuel regulating value, and accordingly regulates the flow of fuel into the carburetor.

Like the device in the '596 patent, the present invention also includes a microprocessor and a fuel regulating valve installed in a low-pressure fuel delivery system between the fuel tank and the carburetor. However, unlike the device in the '596 patent, the current invention does not expressly require an exhaust gas temperature sensor, but uniquely involves sensors for air intake temperature, engine temperature, throttle position, and spark ignition to transmit signals to the microprocessor. Also, unlike the device in the '596 patent that uses the exhaust gas temperature as its baseline control input, the present invention uses the spark ignition signal as the baseline control input for fuel delivery operations within the microprocessor. The microprocessor of the current invention also employs a sophisticated method of controlling fuel delivery that includes, for example, comparing values determined by the signals transmitted from the spark ignition sensor, air intake temperature sensor, engine temperature sensor, and the throttle position sensor with values stored in various maps within the microprocessor. Based on the programming parameters of the present microprocessor, the fuel delivery system is continuously controlled and adjusted by the microprocessor to deliver fuel to increase overall engine operating efficiency.

Finally, because of the difference in size, complexity, and function of the larger engines on which the current invention is used, a number of improvements in and to some of the components generally disclosed in the '596 patent are made that allow those components to operate in a different manner to achieve the more sophisticated operational characteristics of the present invention. For example, the fuel pump, the fuel valve, and the throttle position switch of the present invention are new and novel components that have been especially designed to fulfill the objectives of the present application. Also, the level of complexity and sophistication of the microprocessor and the programs employed by it are significantly increased to accommodate the ability of the present invention to operate with greater efficiency when installed on larger sized two and four stroke internal combustion engines. Thus, while the device of the '596 patent meets the objectives as needed for the types engines considered in the '596 patent, the device herein includes a number of improvements and additional elements that distinguish it from the device in the '596 patent and allow the present device to operate more effectively with larger internal combustion engines such as those used in garden implements and motorcycles.

SUMMARY OF THE INVENTION

In accordance with this invention, a process for controlling the operation of an internal combustion engine having an electronic fuel regulation system (hereinafter "the EFR system") is provided that senses various engine parameters such as throttle position, engine RPM, engine temperature, ambient temperature, engine acceleration/deceleration, and engine loading to control the amount of fuel delivered to the individual cylinders of a multi-cylinder internal combustion engine. A uniquely designed fuel valve and fuel pump are controlled by a microprocessor based electronic control unit employing special programming for its operation. The EFR system also operates at much lower fuel pressures than a standard fuel-injector-based fuel management system. Additionally, the EFR system provides sequential fuel injection to individual cylinders, and is capable of high speeds and throttle body or "in tract" sequential injections.

Because of the special design of the EFR system, the entire EFR system has a small number of components and requires a small amount of electrical energy to operate. Preferably, the electrical current draw of the EFR system is only about 150 milliamps or less, excluding the fuel pump and valve. Additionally with the use of a special fuel pump and fuel valve, the system can operate at under 5 amps, and preferably less than 1 amp.

Among the objects of the invention are to provide an EFR system that includes about a 20% reduction in fuel emissions. Another object is to provide, the control of fuel delivery by the EFR system to provide a flatter torque curve resulting in more usable horsepower from the engine. An additional object of the present invention is to provide an EFR system that is a precise fuel regulation system that substantially increases the usability and efficiency of an engine.

Other objects and features of the present invention will be in part apparent and in part pointed out hereinafter.

BRIEF DESCRIPTION OF DRAWINGS

FIG. 8 is a chart showing an example of the values in a choke setup for a cold start of the engine.

FIG. 9 is a chart showing an example of the fuel delay angle map used by the electronic control unit of the present invention.

Figure 1:
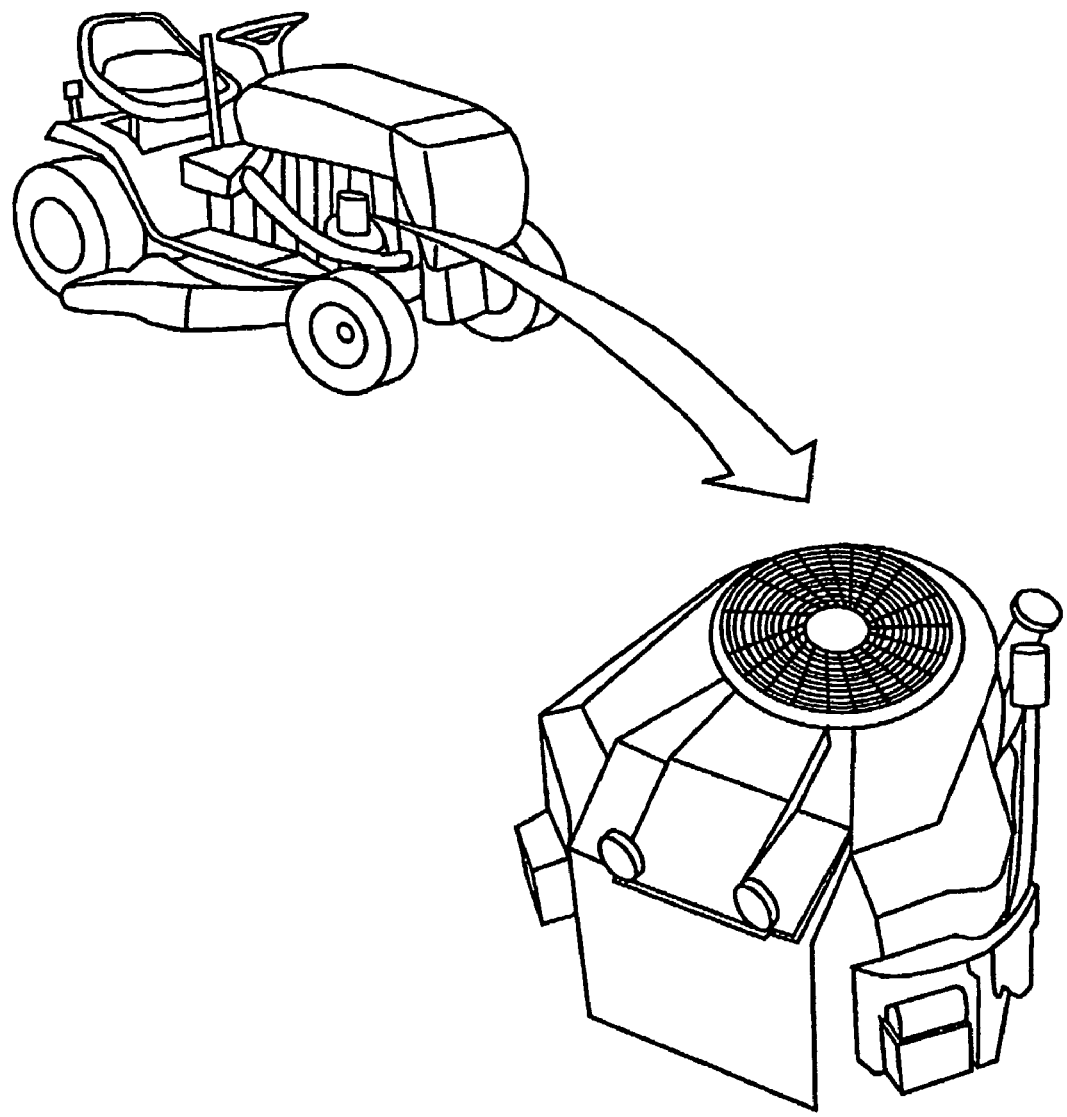
FIG. 1 is a perspective view of a typical installation of the present invention on a lawn and garden apparatus.

APPENDIX A includes one software embodiment of the process for controlling the operation of an internal combustion engine having and electronic fuel regulation system.

Corresponding reference characters indicate corresponding parts throughout the several views of the drawings.

BEST MODE FOR CARRYING OUT THE INVENTION

While there are a number of embodiments of the present invention, the particular embodiment described herein is the process for controlling the operation of an internal combustion engine having an electronic fuel regulation system for use on a twin cylinder internal combustion engine in which the cylinders are arranged in a "V" configuration (referred to hereafter as a "V-twin engine"). FIG. 1 shows on illustrative embodiment of the installation of the EFR system A on a garden tractor B having a multi-cylinder internal combustion engine C.

Components of the EFR System.

Figure 2:
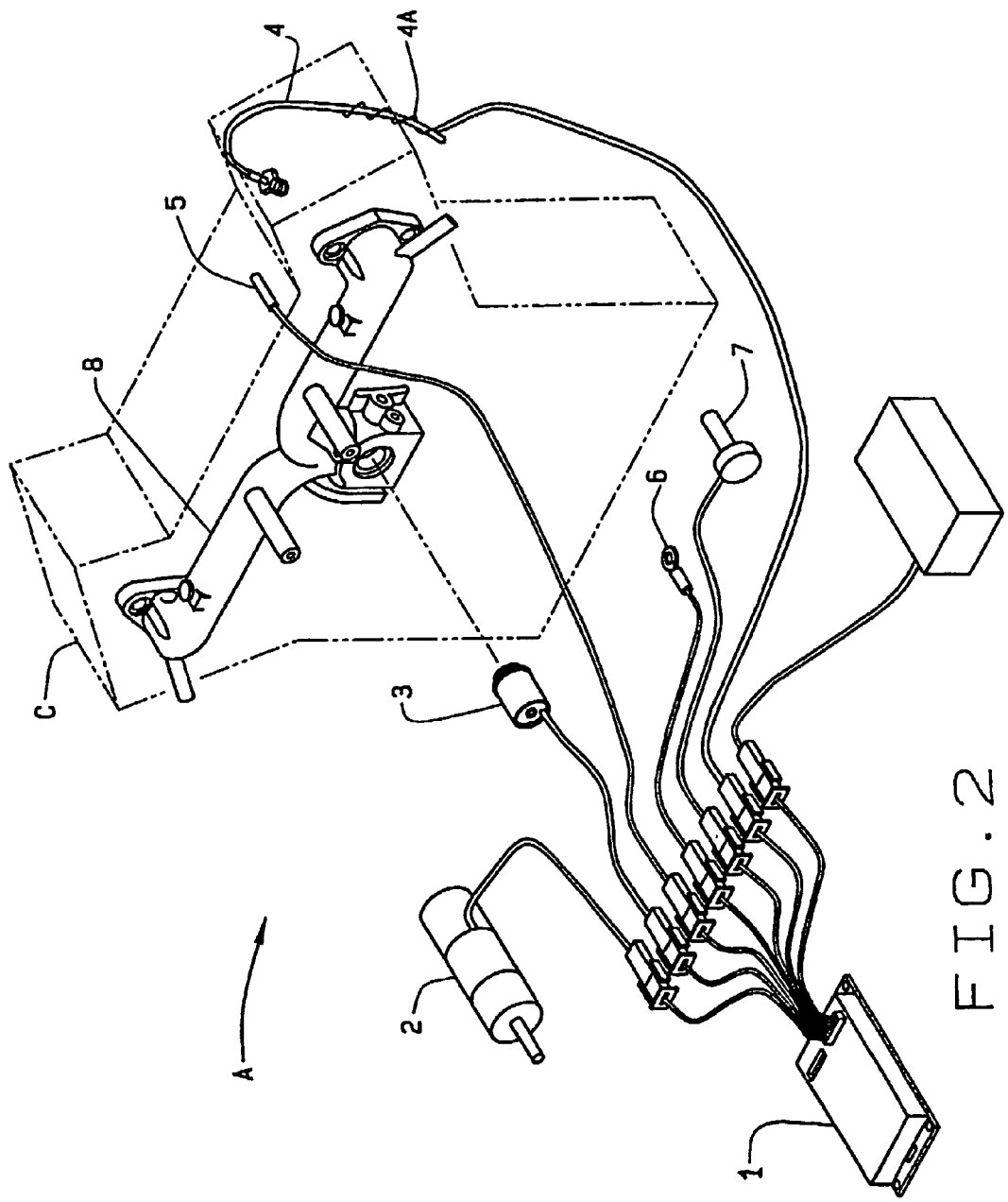
FIG. 2 is a diagram showing how each of the components of the present invention are interconnected.

FIG. 2 is a diagram showing how each of the components of the EFR system are interconnected. The EFR system comprises an electronic control unit 1 (referred to hereafter as "the ECU"), a fuel pump 2, a fuel valve 3, a specially designed engine intake manifold 8, and a plurality of sensors comprising a spark sensor 4 for one or more spark plugs, an intake air (ambient) temperature sensor 5, an engine temperature sensor 6, and a throttle position sensor 7. It will be appreciated by one skilled in the art that the plurality of sensors may include sensors for detection of other environmental characteristics or engine operating characteristics and still remain within the scope of the present invention. These components are generally interconnected by a wiring harness (not shown). Although not a component of the EFR system, the EFR system works in cooperation with a fuel piping system that routes fuel from a fuel tank, through the fuel pump 2 and the fuel valve 3, through the engine air intake manifold 8, and finally into each of the cylinders of the internal combustion engine C.

The spark sensor(s) 4, the intake air temperature sensor 5, the engine temperature sensor 6, and the throttle position sensor 7 are connected to the ECU 1. These components generate and send electrical signals to the ECU 1 that allow the ECU 1 to determine the current operating status of the engine C. The ECU 1 is operatively connected to the fuel valve 3 and operates the fuel valve 3 based upon the multi-dimensional tables present in the software within the ECU 1 as may be modified based on the ECU's assessment of the current operating status of the engine, provided by the various signals sent to the ECU 1 by the above listed sensors. Additional wiring connects the ECU 1 to the fuel pump 2 to allow the operation of the fuel pump 2 to be controlled by the ECU 1.

Description of the Components of the EFR System.

A. The ECU.

Figure 3:
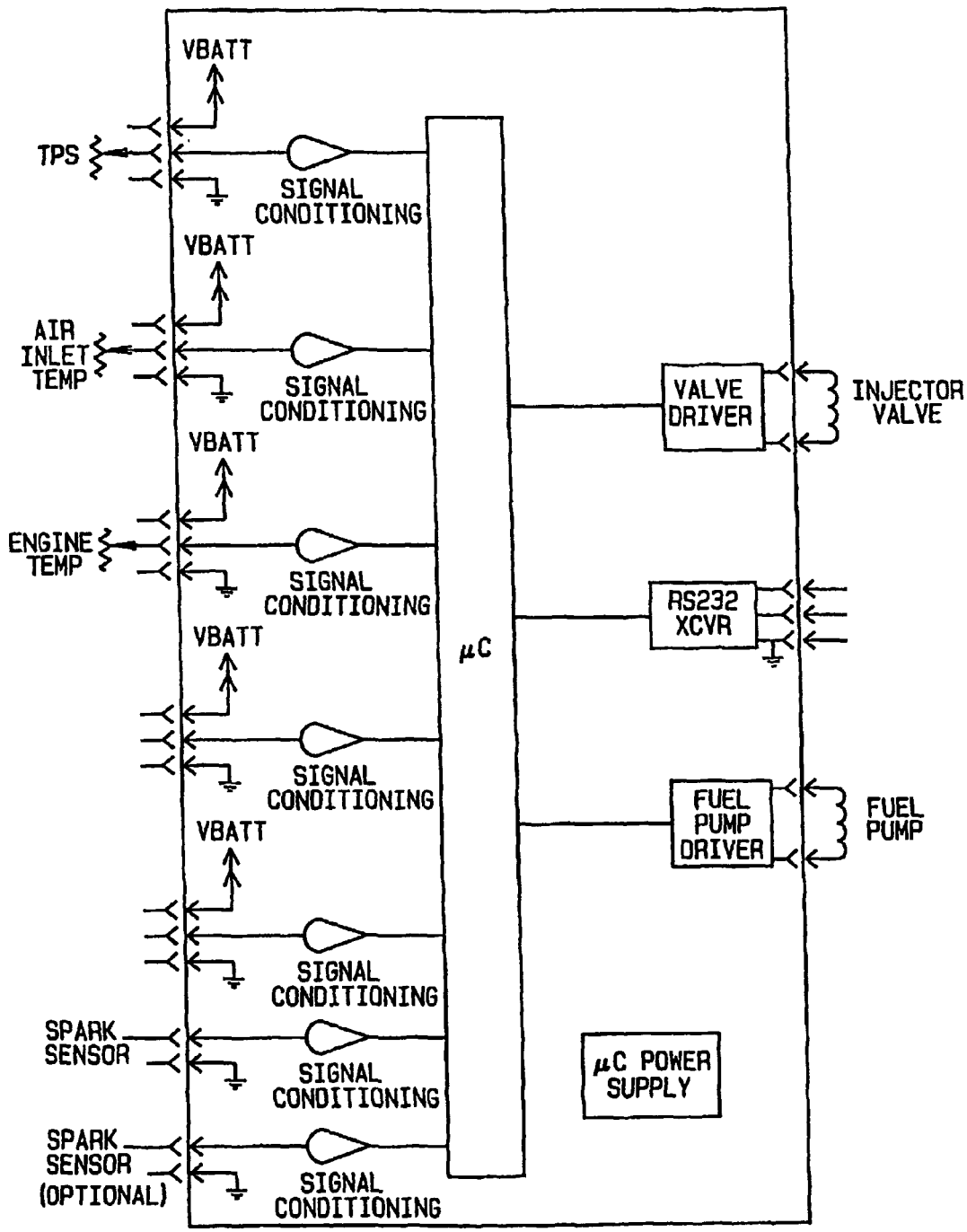
FIG. 3 is a general diagram of the circuits within the electronic control unit.

The ECU 1 is a micro-processor-based unit that regulates the flow of fuel to the cylinders of a internal combustion engine. FIG. 3 provides a general schematic of the circuits within the ECU 1. The ECU 1 comprises a number of components and is mounted in a unique location. Each of these characteristics is fully discussed below.

1. ECU Internal Components.

The ECU comprises an electronic circuit assembly containing a microprocessor 9, an RS 232 serial communications port 10, a non-volatile memory for algorithm and fuel map storage 11, signal conditioning circuits 12, a valve drive circuit 13, and a fuel pump drive circuit 14. The ECU 1 also includes input connections for the throttle position input 15, intake air temperature input 16, engine temperature input 17, and spark sensor inputs 18 and 19. In the present embodiment, the microprocessor is a MC68HC908MRI 6 microprocessor manufactured by Motorola. This is an 8-bit microcontroller having an 8 MHz Hc08 core, 16 KB of in-system programmable FLASH memory, 768 bytes of RAM, a serial communications controller, 7 channel –10 bit A/D, 4 programmable timer/counters and a 6 channel pulse width modulation (hereafter "PWM") ability.

Although the above microprocessor is used in the present preferred embodiment, it will be appreciated that other microprocessors may be used in the ECU 1 as long as the microprocessors are capable of processing the inputs and generating the outputs necessary to operate the EFR system as described herein.

2. ECU Mounting.

Electronics such as those within the ECU 1 are usually sensitive to environmental factors such as heat, moisture, and vibration. The use of such electronics on small internal combustion engines presents special problems in location due to the limited positions available in conjunction with small engines. Because electronic devices such as the ECU 1 have not been used previously for fuel injection systems for small engines, no prior designs have identified an appropriate location for electronics for that application.

The present invention, however, locates the ECU 1 in a unique location that provides the maximum amount of protection from environmental factors that could be detrimental to the ECU 1 operation. Here, the ECU 1 is mounted within the air cleaner shroud, more specifically, the ECU 1 is either mounted directly to the air cleaner cover or to the air cleaner back plate. This location will provide a stream of air that flows around the ECU 1 to keep the ECU 1 from overheating. Additionally, the generally enclosed location is the most environmentally protected area of an engine and acts to inhibit moisture build up on or around the ECU 1.

3. ECU Firmware.

The primary function of the ECU firmware is to control the opening and closing of the fuel valve in conjunction with the firing of the spark plug on a internal combustion engine B of the size described herein. The delay and duration of the fuel valve operation cycle is specified under a two-dimensional look-up table within the ECU 1. This look-up table is indexed by throttle position switch 7 (hereafter "TPS") and engine RPM feedback. Additionally, the duration of the operating cycle for the fuel valve 3 can be automatically adjusted based on choke needs, air inlet temperature, engine temperature, acceleration and/or deceleration, and changes to the engine load.

Other major features of the ECU firmware are automatic power/intake stroke detection, an output signal and/or a pulse width modulation of the output signal to drive the electronic fuel pump, a software generated hours meter, and an RS-232 interface 10 that provides real-time monitoring of the ECU sensors as well as allowing for tuning of the multi-dimensional look-up tables. Non-volatile storage of the tuning parameters is accomplished via an $I^2C$ bus to a 512 byte electronically erasable programmable read-only memory ("EEPROM").

An advantage of this ability to communicate with the ECU 1 through the RS 232 port 10 is that it provides the capability of changing the internal fuel mapping values to match the particular geographic location to which an engine will be shipped. For example, the fuel maps for fuel management optimization for an engine located in Denver, Colo. may be different than those for an engine located in Miami, Fla. If an engine originally tuned for Denver is relocated to Miami, the RS 232 10 port allows for quick revision of the internal fuel maps in the ECU 1. This also prevents the need to find a compromise setting in the fuel management system that uses fuel maps that will work only marginally well in either the Denver or Miami locations. Instead, the ECU 1 can be programmed to manage the fuel system for maximum power and efficiency, while at the same time keeping fuel emissions low.

In the present embodiment, the ECU firmware for the microprocessor is written in assembly language. This provides the fastest operating speed and the smallest footprint solution possible. It will be appreciated, however, that the ECU firmware may be written in any computer language so long as the language used is acceptable for use with the microprocessor of the ECU and the firmware operates as specified herein.

For ease in program organization, the firmware is divided into ten major modules along with seven other modules that provide constants and default operating values. The following section lists all of these firmware modules and a brief description of each. Additionally, Appendix A includes one embodiment of the software used in the ECU to control the operation of an engine having an electronic fuel regulation system.

Figure 4:
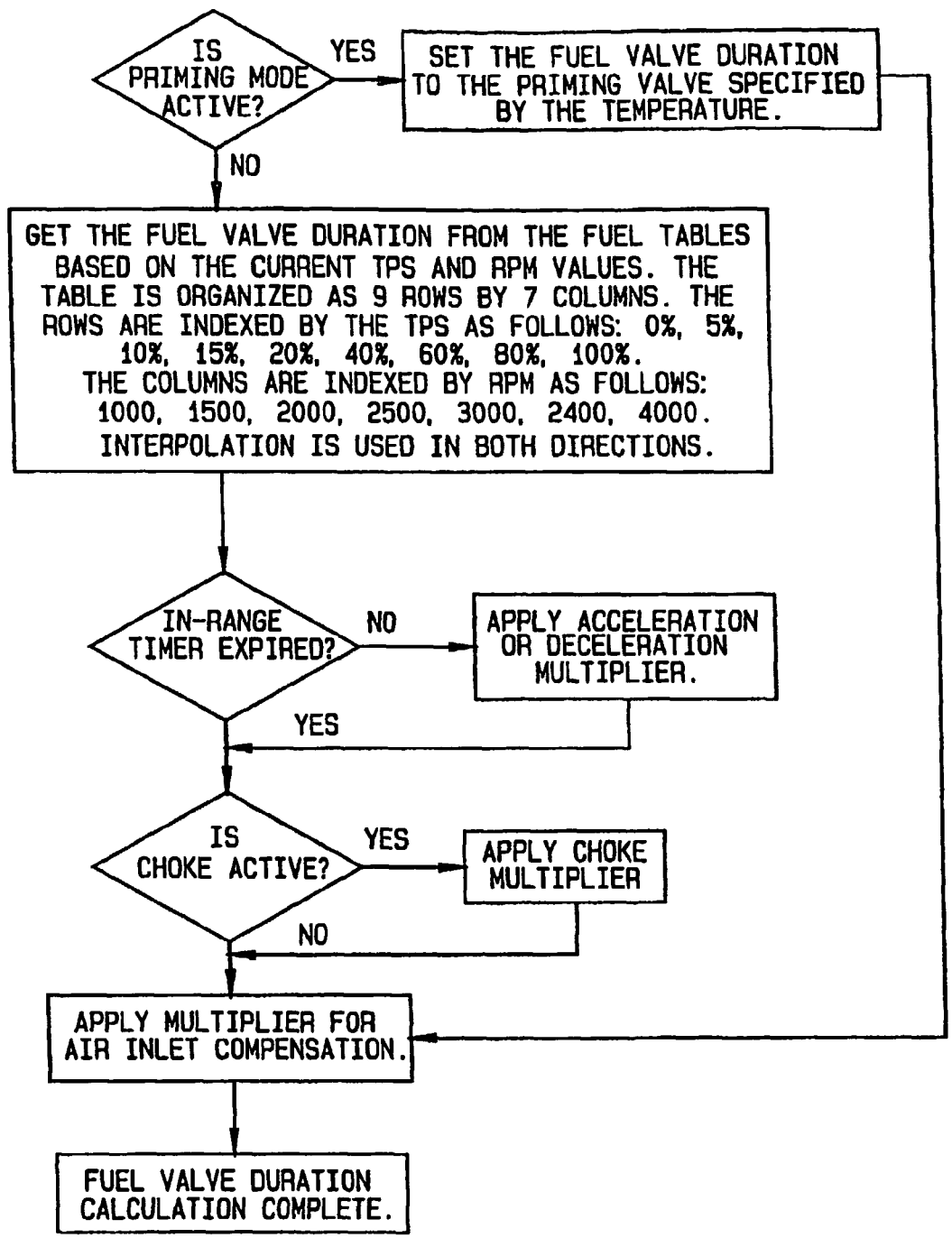
FIG. 4 is a flow chart that shows the processing of the fuel valve duration calculations.

Calc.asm Contains routines to perform all engine parameter calculations including temperature, air temperature compensation, battery voltage, fuel pump PWM parameters, RPM's, fuel pressure, throttle position ("TPS"), choke, engine acceleration/deceleration, fuel valve 3 delays, and fuel valve 3 duration. The fuel valve calculations include the computations of the delay between engine spark detection and fuel delivery, as well as the duration of time that the fuel valve 3 is kept open. These calculations are performed separately for each of the cylinders of the engine C. The delay values are taken directly from the fuel valve delay tables. The duration value can have several adjustments applied to them depending upon the current operating conditions. FIG. 4 shows a flow diagram for the processing of the fuel valve 3 duration calculations.

Drv2d.asm Contains routines to control the seven channel ten-bit analog to digital converter that is built into the MC68HC908MR16 microprocessor 9. Analog inputs include TPS, air inlet temperature, engine temperature, fuel pressure, battery voltage, and air intake ambient temperature.

Drveeprm.asm—Contains routines to store and retrieve parameters to and from the EEPROM. Parameters include the fuel valve delay tables, the fuel valve duration tables, choke parameters, TPS calibration, and hours meter.

Drv2c.asm—Contains routines to control the clock and data lines necessary to operate the $I^2C$ serial bus.

Drvpwm.asm—Contains routines to initialize and control the PWM pins on the microprocessor 9.

Drvsci.asm—Contains routines to initialize, send, and receive data on the serial communications interfaces of the microprocessor. This interface is used for RS 232 communications.

Drvtm.asm—Contains routines to initialize and control the four timers/counters of the microprocessor 9. These are used for spark input, valve input, and also for a 100 microsecond periodic timer.

Math08.ams—Contains routines to perform a software 16×16 unsigned multiply and a 32×16 unsigned divide function.

Figure 5:
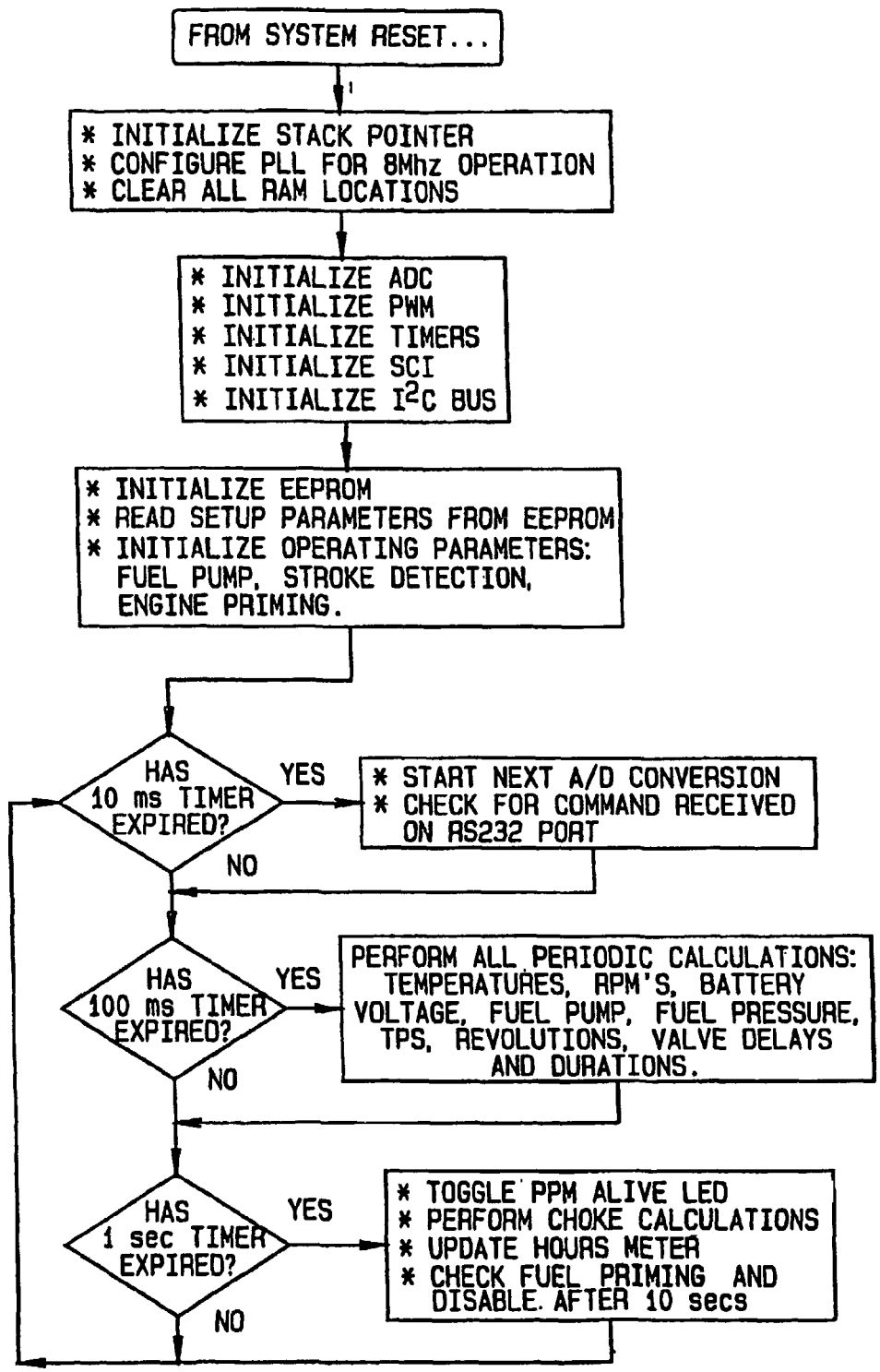
FIG. 5 is a flow chart that shows the main processing loop used to continuously monitor and control the entire operation of the firmware in the electronic control unit of the present invention.

Ppm08.asm—Contains the reset start point, the main processing loop, and reset vector table for the entire firmware. Also contains routines to retrieve and update the hours meter to and from the EEPROM. The hours meter is updated every 0.10 hour. The main processing loop is used to continuously monitor and control the entire operation of the ECU firmware. FIG. 5 contains a flow chart of this routine.

Serial.asm—Contains routines to communicate with the engine monitoring software via the RS 232 serial port. The specification for the serial protocol is contained in a separate document.

Constant.inc—Contains miscellaneous constant definition used throughout the firmware.

Hc08regs.inc—Contains all RAM and FLASH memory definitions as well as the register definitions for the MC68HC908MR16 microprocessor 9.

Interp.inc—Contains a look-up table used to convert the analog input from Motorola MXP5100 series pressure sensors into pounds per square inch ("PSI"). The 0.5 to 4.5 VDC analog input is converted to 0 to 14.5 PSI.

Ram.inc—Contains all of the RAM variable storage definitions used by the firmware.

Tables.inc—Contains the default values for the fuel valve delay tables, fuel valve duration tables, acceleration/deceleration tables, choke, fuel pump 2, battery compensation tables, priming and TPS calibration.

Thermist.inc.—Contains the look-up table used to convert the analog input from the thermister to temperature in ° C. The 0 to 5 VDC analog input is converted to −40 to +125° C. This table is used for ambient, engine, and air inlet temperature calculations.

While the firmware for the ECU is broken into the above firmware modules, it will be appreciated that the ECU firmware may be organized in any manner and contain any number of modules so long as the firmware performs at least the ECU functions as described herein.

4. ECU Multi-Dimensional Mapping.

The ECU 1 is equipped with a plurality of electronic maps that are used by the ECU 1 to optimize the operation of the engine B. While the content and number of the plurality of electronic maps be varied as need to fit each specific small internal combustion engine application, the plurality of electronic maps will include at least those maps identified herein.

Figure 6:
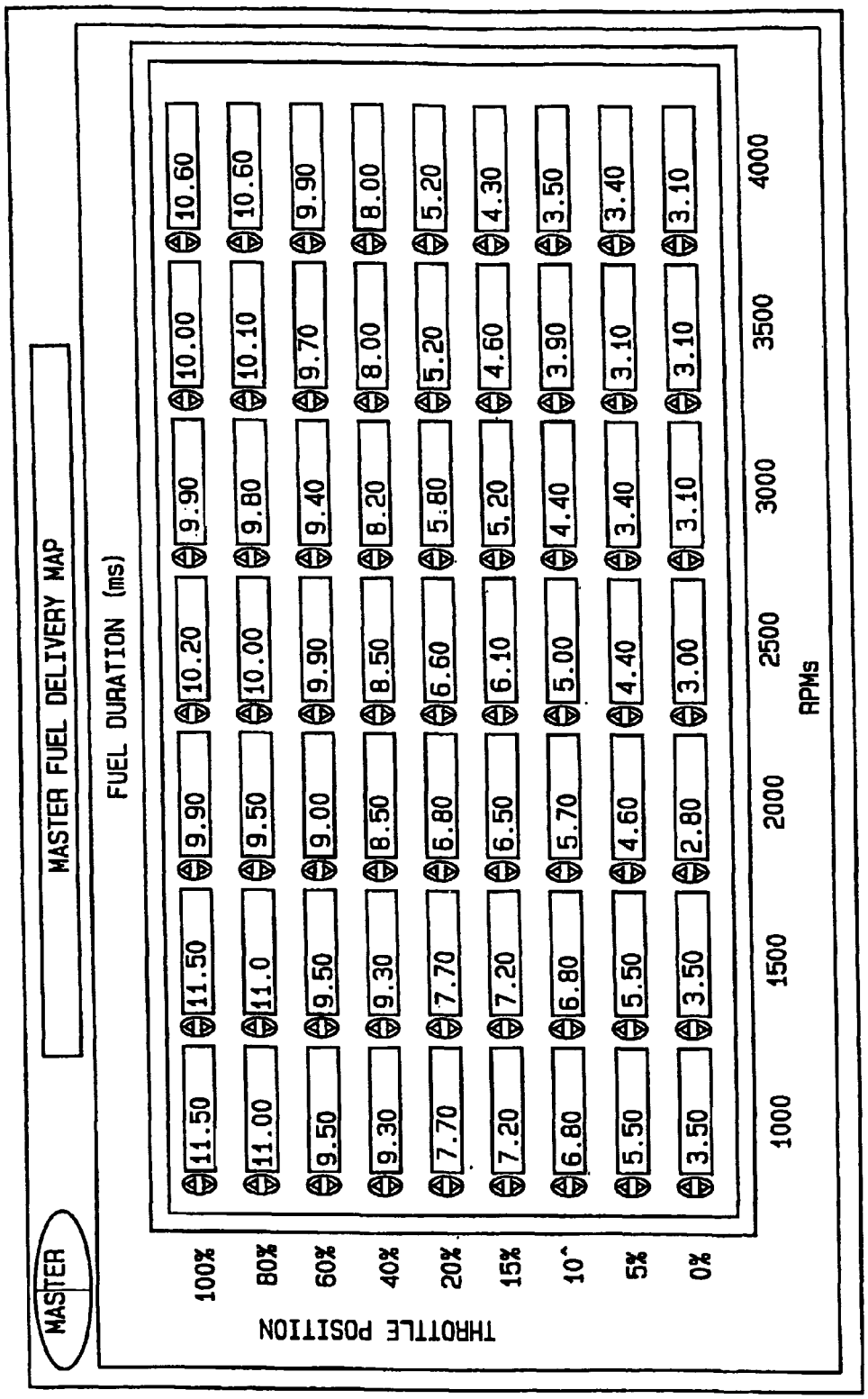
FIG. 6 is chart showing an example of the multi-dimensional map for the master cylinder as controlled by the electronic control unit of the present invention.
Figure 7:
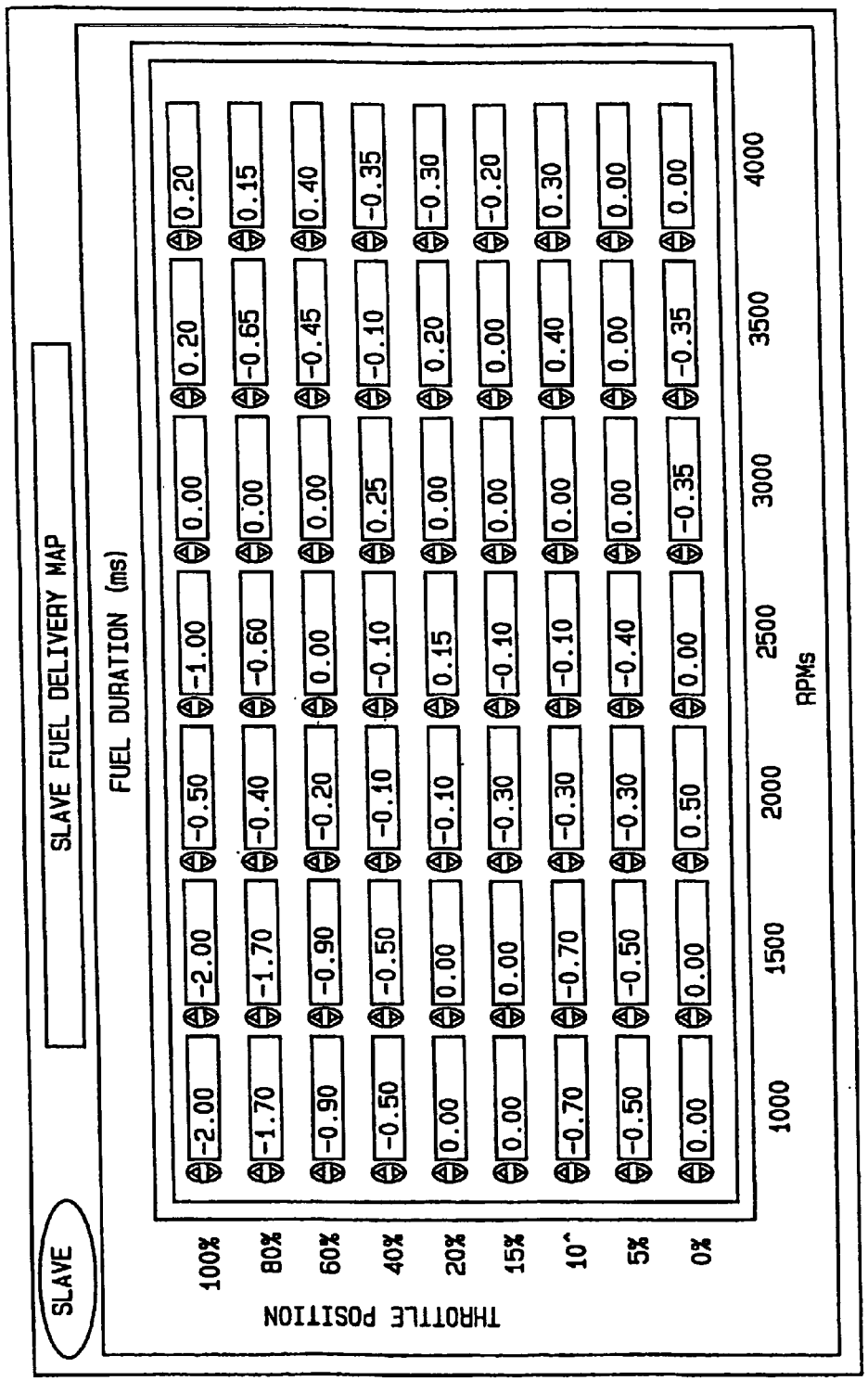
FIG. 7 is chart showing an example of the multi-dimensional map for the slave cylinder as controlled by the electronic control unit of the present invention.

In the present embodiment, the plurality of electronic maps are used in a V-twin engine application where one of the two cylinders is arbitrarily designated the "master cylinder" and the other of the two is designated the "slave cylinder," two sets of multi-dimensional maps are provided, one for the master cylinder and one for the slave cylinder. Each of these maps contain two dimensions with the vertical dimension being the position of the throttle position switch 7 and the horizontal dimension being the engine RPM. The TPS is indicated by the percentage that the throttle position is in related to its maximum open position. For each intersection of these two variables, there is a specific time duration that represents the amount of time in milliseconds that the fuel valve will be open to allow fuel to enter the intake manifold. An example of the multi-dimensional map for the master cylinder and the slave cylinder are shown in FIG. 6 and FIG. 7 respectively.

Each of the master and slave cylinders also has a fuel delay angle table. This fuel delay angle acts to determine the exact time the fuel valve 3 is opened in relation to the signal received from the ignition spark sensor 4. It is also possible in the case of a single sensor to determine the appropriate timing for a second, third, etc. cylinder. In this manner, the timing of the delivery of the fuel to the individual cylinder is optimized to place the fuel within the cylinder at the precise time needed to allow the ignition spark to burn the fuel efficiently and with the best power output. An example of the fuel delay angle map is shown in FIG. 9.

It is important to note that while the ECU firmware includes a two dimensional map based on the TPS and engine RPM, other embodiments of the present invention may use other multi-dimensional maps that rely upon any of the described sensor inputs within any of the of EFR system. This allows the ECU 1 to operate with a two dimensional coordinate map while being capable of having another processing subroutine revise the original fuel map based on certain other inputs, so that the two-dimensional fuel map itself is variable.

It will be appreciated that the values in the multidimensional fuel maps will change to match the needs of a specific engine depending on the size and performance of the engine. In general, the values within the multi-dimensional maps are determined empirically through a series of operational tests conducted on a specific model of internal combustion engine when the engine is equipped with the present EFR invention.

B. The Fuel Pump.

The fuel pump 2 in the present invention is specially designed to operate on varying duty cycles controlled by the ECU 1 when it varies the pulse width of the electrical power sent to operate the fuel pump 2. While the EFR system operates with an average fuel system pressure of about 15 psi or less, the fuel pump 2 of the present embodiment creates an average fuel system pressure of generally between about 2 psi and about 10 psi. The fuel pump 2 of the present invention may be of any type and may require simple on/off control and/or pulse width modulation control.

Because the ECU 1 provides the power and control circuits necessary to drive the fuel pump 2, the fuel pump 2 itself is smaller and less complex than standard fuel pumps. The design of the fuel pump 2, particularly its size, means that the fuel pump 2 requires less electrical current for operation. Additionally, the fuel pump 2 incorporates an inertial check valve that reduces the overall effort needed control the internal components of the fuel pump 2. To make the overall EFR system A as compact as possible, a fuel filter is completely integrated within the housing of the fuel pump 2. While in the present embodiment the fuel filter is not removable from the housing of the fuel pump 2, those skilled in the art will recognize that other embodiments of the present invention can have a removable fuel filter. Also, the present embodiment shows the fuel pump 2 mounted externally from the fuel tank 2A, however, the fuel pump 2 may be mounted inside the fuel tank 2A and still remain within the scope of the present invention.

The internal components of the fuel pump are also different than standard fuel pumps. Specifically, standard automotive versions use a spring, a damper, and a check valve to provide an internally sprung check valve. In contrast, the fuel pump of the present invention does not use a spring at all. Instead, the present fuel pump uses a trapped ball that acts as a check valve as it cycles back and forth within the fuel pump housing. When the fuel pump piston moves forward, the trapped ball acts as an inertial check as it traps the fuel thus allowing fuel to be propelled forward. When the fuel pump piston moves backward, the trapped ball opens to fill the now void cylinder.

While the fuel pump described for the present embodiment of the EFR system includes the above components, it is understood that any fuel pump may be used as long as the fuel pump is capable of providing an average fuel system pressure of about 15 psi or less, and preferable between about 2 psi to about 10 psi.

C. The Fuel Valve.

Most non-carburetor-based fuel management systems use fuel injectors. While such fuel injectors are standard within the industry, they can be costly. Many fuel injectors are also designed to operate at very high fuel pressures in the range of 60 to 80 psi. The need for high fuel pressure demands high power solenoids that control fuel injection.

Instead of a fuel injector, the present invention uses a specially designed solenoid controlled fuel valve 3 made to operate within the EFR system A and to be used for small engines C incorporated into lawn and garden applications, as well as other portable applications. The design of the fuel valve 3 allows it to function well at much lower fuel pressures. For example, the EFR fuel valve 3 operates at a fuel pressure of less than 15 psi, with a preferable operating pressure within a range of about 2 psi to about 10 psi. The design of the internal components of the fuel valve 3 also allow the fuel valve 3 to cycle at very fast rates. Specifically, the present fuel valve 3 can operate at cycles having durations of 12 milliseconds or less. The fuel valve can also deliver on/off (plunger take-off to plunger touch-down) response times under 2 milliseconds.

Figure 13:
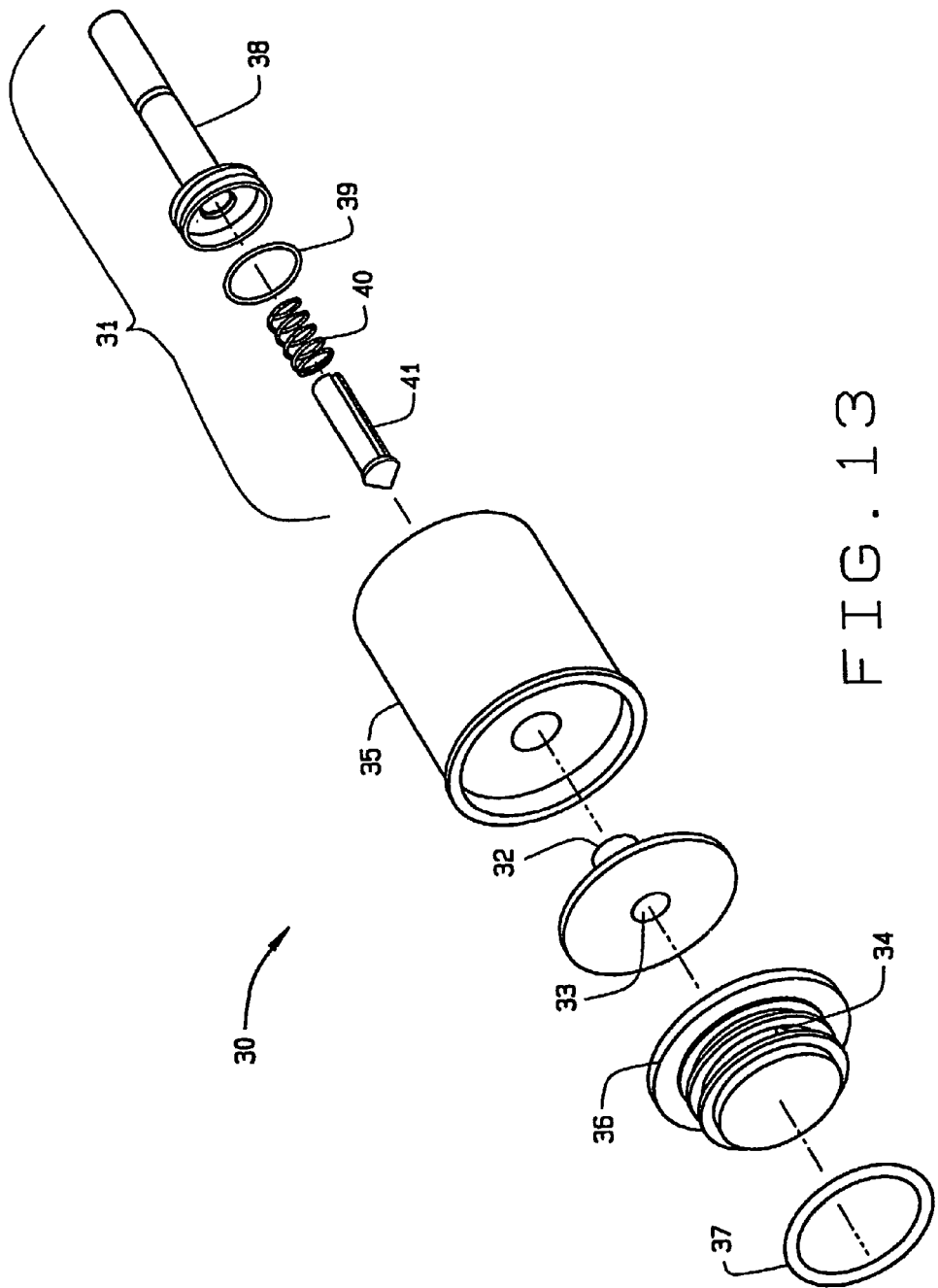
FIG. 13 is an exploded view of the fuel valve used by the electronic control unit of the present invention.

Referring now to FIG. 13, the fuel valve 30 3 includes a body 35, and end cap 36, a seal 37, and a plunger 31, the plunger 31 including an end having a conical shape with an angle of between about 45 degrees and about 49 degrees. The plunger 31 includes a plunger shaft 38, a seal 39, a spring, 40 and a conical plunger 41. The conically shaped end of the conical plunger 41 cycles against a seat 32 having a matching conical shape. This combination of conical plunger 41 and conical seat 32 creates a seal that closes a fuel distribution orifice 33 in the fuel valve 3. The conical plunger 41 and matching conical seat 32 are also beneficial because they provides a large landing area for the conical plunger 41 and eliminates the need for an elastometric seal at that point, thereby increasing the useful life of the fuel valve 3. Use of the matching shape also eliminates the delay in cycle operation of the fuel valve 3 caused by minimal adhesion forces that must be overcome when other plungers are lifted from an electrometric seal. Although the above embodiment is useful in the present invention, in other embodiments of the fuel valve 3, the conical shape of the conical plunger 41 cycles against an elastometric seal that acts as a valve seat for the fuel valve 3.

The body 35 includes a solenoid coil, wiring, and connectors (not shown) necessary to attach the solenoid 35 to the ECU 1 to allow the ECU 1 to control the operation of the fuel valve 3.

The fuel valve 3 also has an integrated fuel rail 34 in the end plate 36 to allow for mounting the fuel valve 3 into a portion of the intake manifold that is directed toward the individual cylinders. Standard fuel injectors do not have integrated fuel rails. Instead, the fuel rails of standard fuel injectors are separate components mounted to the engine for use in conjunction with the standard fuel injector.

It will be appreciated by those skilled in the art that any fuel valve may be used as long as the fuel valve is capable of having a cycle duration of 12 milliseconds or less and on/off response times of under 2 milliseconds when operating within a fuel delivery system having an average operating pressure of about 15 psi or less, preferably between about 2 psi and about 10 psi.

D. The Engine Intake Manifold.

The intake manifold of a standard carburetor-based internal combustion engine takes air obtained from an air filtering device and carries that air with the fuel that has been inserted into the intake manifold by a carburetor. In the present invention, the air intake manifold 8 is specially designed to allow the fuel valve 3 and pressure regulator to be directly mounted within the air intake manifold 8. This not only reduces the overall weight and complexity of the EFR system A, it also places the fuel delivery device at a point generally and optimally equidistant from each of the cylinder heads on a V-twin internal combustion engine C. The placement of the fuel valve 3 on the air intake manifold 8 also locates the fuel valve 3 further away from the hotter components of the engine C thereby reducing the likelihood of vapor lock within the fuel system. It is noted that any air intake manifold may be used so long as the air intake manifold allows for the mounting of a fuel valve as described herein and will function properly with the small internal combustion engine being utilized. Additional manufacturing flexibility of the manifold is realized with the EFR system because synchronous fuel injection allows for asymmetric intake manifold runner lengths while still providing balanced air/fuel ratios to both cylinders and while still sharing a common collector point and a single injector mounted in the collection point.

E. The Throttle Position Sensor.

All internal combustion engines C have some sort of throttle control. In the present invention a throttle position sensor 7 is incorporated to indicate the position of the throttle control. The throttle position sensor generates a signal that is sent to the ECU 1. The ECU 1 then uses this signal and references a multi-dimensional fuel map to determine the duration of time that the fuel valve 3 is open and the delay, if any, needed to compensate for acceleration/deceleration demands and/or engine loads.

F. The Ignition Spark Sensor.

Overall timing of fuel distribution on most internal combustion engines C is usually predicated on a position detection device that is connected to one of the rotating components of the engine C. For example, the position detection device can be a Hall-Effect sensor located near a wheel having a missing tooth that may be attached to either the crankshaft or the camshaft of the engine. Such position detection devices complicate the fuel management system while adding cost and maintenance to the system.

The present invention has no such additional physical position detection devices. Instead, a single wire 4 is wrapped around the high tension wire 4A connected to one or each of the spark plugs 4B, depending upon the application. When the spark plug 4B is fired, a signal is generated that is sent to an input on the ECU 1. In fact, this configuration acts as a magnetically coupled electrical signal correlating to one RPM of the crankshaft and is used to drive the EFR fuel-management system A. The ECU 1 preferably uses this spark sensing signal as a baseline for many of the subsequent fuel delivery computations within the EFR system A. As an alternative, the spark sensor may be connected to the cut out terminal.

It will be understood by those skilled in the art that the ignition of a spark plug may be detected in a number of ways other than as described herein. Any method of the ignition of a spark plug may be used so long as a signal is sent to the ECU that represents the detection of each ignition of the spark plug.

G. The Engine Temperature Sensor.

The amount of fuel needed by the engine C to operate the engine at peak efficiency is dependant upon a number of variables. One of these variables is the temperature of the engine itself. When an engine C is cold, more fuel is needed to operate the engine C. When the engine C is warm, less fuel is need for the engine C. Because the function of the ECU 1 is to manage the overall EFR system A to maximum efficiency, the EFR system A includes a sensor 6 that is mounted onto the engine C to detect the temperature of the engine C and send an appropriate signal to an input of the ECU 1. The ECU 1 then uses this signal to either make the fuel mixture rich or lean as the current engine conditions dictate.

H. The Air Intake Sensor.

Figures 11, 12:
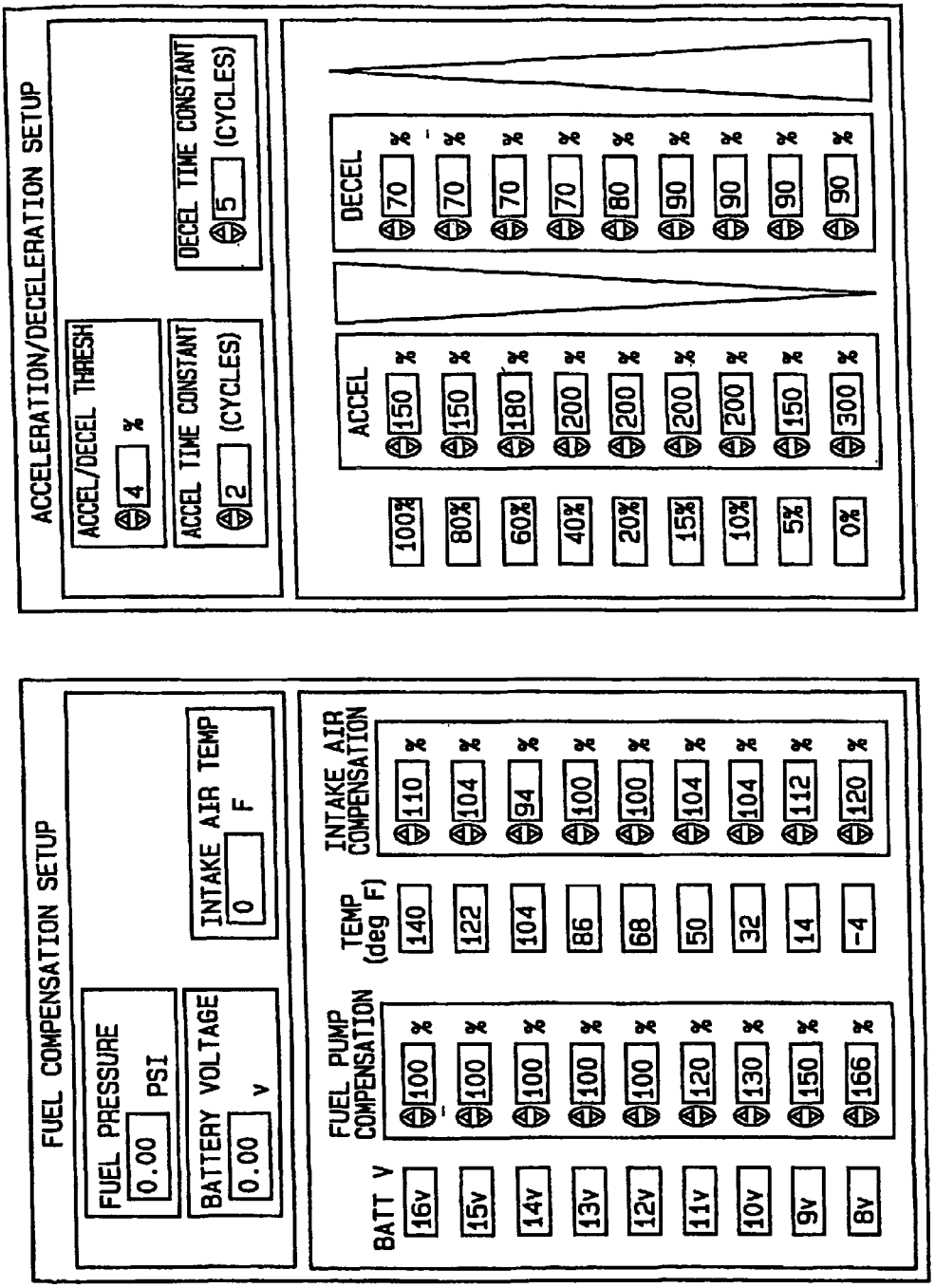
FIG. 11 is an example of a fuel map containing values to compensate for variations in the air intake temperature.
FIG. 12 is an example of a map that contains values to compensate for engine acceleration or deceleration.

The optimum air/fuel mixture on a internal combustion engine C is dependent upon the temperature of the air being drawn into the engine through the air intake manifold 8. Because the ECU 1 is responsible for maintaining the optimum air/fuel mixture, an air intake sensor 5 is placed within the air intake manifold 8 of the engine C. The air intake sensor 5 detects the temperature of the intake air and then sends an appropriate signal to the air intake temperature input of the ECU 1. The ECU 1 uses this information to adjust the fuel map for the master and slave cylinders to optimize the amount of fuel being sent to each of the engine cylinders. FIG. 11 shows an example of a map showing adjustments made to the EFR system A as a result of variations in the air intake temperature signal sent to the ECU 1.

Operation of the EFR System.

A. General System Considerations.

1. Power/Intake Stroke Detection.

The EFR offers four methods of power/intake stroke detection as shown in the following paragraphs. Those skilled in the art will recognize that, depending upon the specific application, the use of one, multiple, or combinations of parts of each of the following four methods may be chose to accomplish stroke detection.

a. Method One.

The ECU 1 receives two spark indications per revolution at initial ignition and then a single spark input signal from each cylinder that is the summation of the firing of the spark for both cylinders of a V-twin internal combustion engine C. These two cylinders are identified herein by the designation of one cylinder as the "master cylinder" and the other cylinder as the "slave cylinder." Because all timing is done relative to the master cylinder, the firmware must distinguish between the power stroke and the intake stroke. To accomplish this, the firmware uses one of the timers in the microprocessor 9 to time the interval between the spark signal inputs. This timer has a resolution of 5 microseconds. Every other interval is average 64 times and the sums are divided by 64 to provide 2 averaged intervals. These intervals are then compared with each other and the smaller interval is chosen as the power stroke and is used as the trigger for all fuel valve delays and fuel valve durations. In addition, the difference between the averaged intervals must be greater than a programmable parameter. The parameter of the present embodiment is about 100 microseconds.

Figure 10:
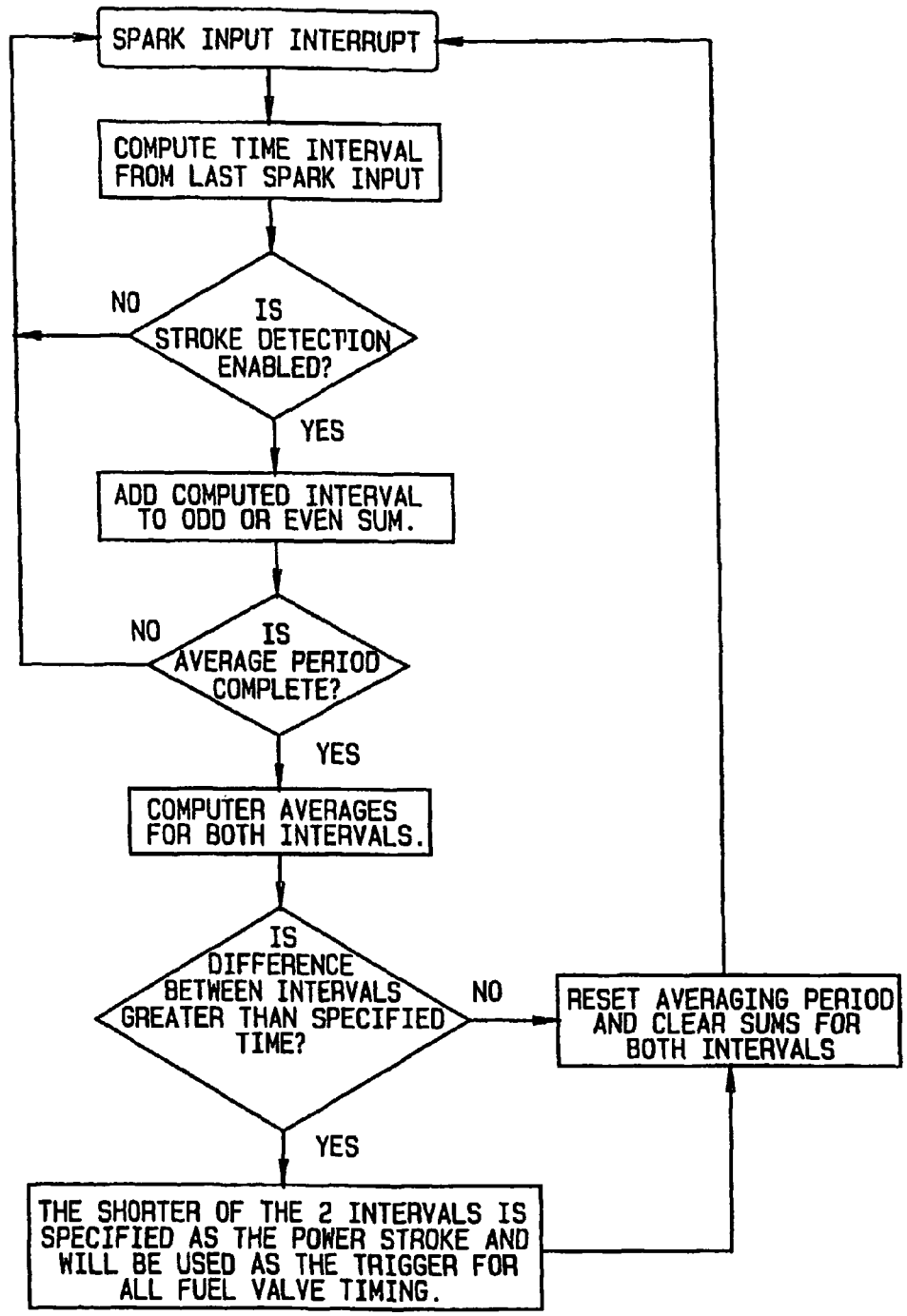
FIG. 10 is shows a flow chart for stroke detection by the electronic control unit of the present invention.

Stroke detection can be enabled, disabled, or manually toggled via the engine monitoring software. Stroke detection is automatically disabled when the RPM of the engine is less than 1000. This is to prevent any false detections during engine starting. Both of these time intervals are provided to the engine monitoring software via the RS 232 serial 10 port for real time monitoring. FIG. 10 shows a flow diagram for stroke detection.

b. Method Two.

The power/intake stroke can also occur upon startup of the engine.

c. Method Three.

The third method is based upon cycle discrimination. This method of cycle recognition utilizes the time difference between the power and intake strokes and specifically the sign of the difference instead of the magnitude. The sign bit of the assigned power stroke time minus the assigned intake stroke time is accumulated over a period of n cycles. After n cycles, a determination is made to reassign the power and intake cycle based on the accumulated sign bit data. If the number of accumulated negative sign bits is greater than the number of positive sign bits, the result is that the correct power and intake cycles are assigned and no changes are required. If the accumulated results are that more positive sign bits have been accumulated, the assigned power stroke is reassigned as the intake stroke and vise versa.

d. Method Four.

This method uses cycle recognition using RPM windowing. This method of intake/power stroke determination is extremely useful when dynamic loads are present on the engine crankshaft. Dynamic loads use the timing relationships between the power and intake strokes to change at different loads and RPM's. This RPM windowing techniques relies on prior characterization of engine cycle timing under specified operating conditions. When a characterization is complete, a look up table (LUT) is programmed into the engine controller that defines a nominal timing relationship. During operation, the engine controller compares the assigned power stroke time minus the assigned intake stroke time to the appropriate LUT bin associated with the current RPM and load. If the delta between the LUT value and the current stroke delta is greater than a programmable duration, the assigned power stroke is reassigned as the intake stroke and vise versa. Additional averaging of the stroke delta is programmable as well.

2. Driving the Fuel Pump.

Standard fuel pumps have either integrated electronics located within the fuel pump assembly or have another separate set of electronics mounted elsewhere. To save cost and simplify the overall system, the current invention does not have these types of electronic control devices. Instead, the ECU 1 itself is used to drive the fuel pump 2. This allows the ECU 1 to control the fuel pressure by controlling the pulse width of the electrical power sent to the fuel pump 2. Thus, the pulse width of the power sent to the fuel pump 2 is modulated to compensate for the fuel pressure demands or for system voltage variations. In this way, controlling the power to the fuel pump 2 allows the ECU 1 to increase or decrease the fuel pressure much like a pressure regulator.

The electrical power available to operate a fuel pump 2 in a portable system can vary depending upon the strength of the battery. Sometimes the system voltage may be low, while at other times the system voltage may be high. This system voltage variation can cause differing fuel pressures within the system as a result of the varying voltage sent to the solenoid of the fuel pump 2. In particular, low voltage causes an incomplete rest of the plunger within the fuel pump 2. By having the ECU 1 increase the duration of the power sent to the fuel pump 2 increasing the pulse width of the fuel pump power, the coil on the fuel pump solenoid will have a longer time to become electrically saturated to achieve full electromagnetic pull and retention of the plunger in the solenoid of the fuel pump 2. This results in a consistent fuel pressure during periods of low system voltage. FIG. 11 shows an example of the percentage of increase in the time that the fuel pump 2 is operated based upon the voltage detected by the ECU 1 when first energized.

Additionally, operating the fuel pump 2 by varying the pulse width of the electrical power sent to operate the fuel pump 2 allows for faster fuel pressure development during low voltage situations and during engine startup. Once the system voltage stabilizes, the ECU 1 shortens the pulse width of the power sent to the fuel pump 2 to reduce the overall system demands upon available electrical current.

In alternative embodiments, a motor driven pump may be used to control the fuel flow in the EFR system. Also, any pump used may employ the use of a simple on/off control and/ore the use of pulse width modulation to power the pump. This may prove efficient in systems when the pump would drive at a higher duty cycle or full on (depending on the type of pump) during high fuel demands and low duty cycle or during low fuel consumption and to conserve system power consumption.

In other embodiments, an exhaust gas temperature sensor may be used as an input to the ECU to control the engine fuel mixture. Such regulation of the fuel mixture during engine operation may be performed as a closed loop procedure which includes search cycle to locate the optimum fuel mixture within a predetermined EGT range.

3. Delay of Fuel Valve Activation.

In the case of a V twin engine C, there are substantial differences in the amount of time between the intake and exhaust stroke of the master cylinder compared to the intake and exhaust stoke of the slave cylinder. This is due to the basic geometry of V-type engines and the rotation of the crankshaft and the camshaft. As a result of this time variation between the master cylinder and the slave cylinder, the timing and duration of the delivery of fuel to each cylinder is different.

For example, most V-twin internal combustion engines C have a 90 degree V between the two cylinders. In this situation, the timing between one intake charge and the next intake charge are not the same, because the one charge gets a longer pull due to valve open duration than the other charge, thus resulting in one cylinder getting to breathe better. The negative manifold air pressure for the first stroke is not as deep as for the second stroke because the second stroke has a longer time to draw the air. This means fuel needs to be added or subtracted because one cylinder breathes better than the other cylinder and because the first cylinder does not have as long to take in air. Therefore, under uncontrolled conditions, the first cylinder can be slightly leaner or slightly richer than the second cylinder and there is a need to balance the air intake to the cylinder that is typically leaner or richer, or to adjust for the air intake imbalance.

In normal fuel injected engines this is an imperfect science because if the engine is running better or if the engine's idling, the timing is different than if the engine is running full throttle. Thus, the normal fuel injection system can only make limited adjustments within a specific RPM range and may only have a fixed injection delay throughout the entire RPM range.

In contrast, the EFR system A is able to compensate for these differences by adding or subtracting to the fuel delay angle during the intake of each individual cylinder. The EFR system A compensates for this difference by having multidimensional maps for the master cylinder that are different from the multidimensional maps for the slave cylinder. In this way, the numbers in the maps are adjusted to allow for a delay in the fuel valve 3 activation and that delay compensates for the intake timing difference between the cylinders. Basically, the slave values are adjusted by either adding or subtracting the master's fuel delay at different stages. This embodiment is used if only one spark plug is employed. If two or more pickups are used, the respective cylinder is not added or subtracted from the master, but will instead be added or subtracted from itself. In this case, the intake duration is a little longer on one side so the fuel valve 3 activation delay is either a little longer or shorter depending upon the specific engine. Either way, the fuel valve 3 activation duration and delay are individually controlled by the ECU 1 and in this example the values for the slave are functions of the values of the master. This allows for significant design flexibility in placement of the fuel valve and design of intake runner lengths.

4. Lean Cylinder Control

In an internal combustion engine, the air flow changes as the engine RPM changes. When these air flow changes occur employing a common collector intake manifold, the fuel mixture to one of the engine cylinders can become lean. Running an engine cylinder in a lean condition for an extended period of time can damage the piston of an engine. To alleviate this potential problem, the EFR system A has the ability to independently lean or enrich either of the two engine cylinders of a V twin internal combustion engine C.

Because the multidimensional fuel maps in the ECU 1 can be specifically tailored to a specific engine type, testing the fuel mixture of an engine by checking the carbon monoxide emission from the engine can ascertain whether any cylinder on a certain series of engines will cause the fuel mixture to a cylinder to become lean. The values of the multidimensional tables in the ECU 1 are then generated with the knowledge that a particular cylinder will run lean at a certain engine RPM, and that this condition must be compensated by increasing the amount of fuel to that cylinder at the critical engine RPM. This is accomplished by increasing the time durations of the fuel valve 3 at a specific RPM on the multidimensional maps for the appropriate cylinder.

5. Load Sensing.

When a internal combustion engine C is in operation, there are circumstances that sometimes change the load placed upon the engine C. A typical situation would be a portable generator set. The generator set typically supplies a certain level of electrical current that places a certain load on the internal combustion engine C driving the power generating component of the unit. Under this steady current load, the internal combustion engine C driving the electrical generating component is stabilized. When a sudden and continuous increase in the demand for electrical current occurs, the generating component places a sudden greater load on the engine C. To operate properly, the engine C must compensate for this additional load by adjusting the throttle to maintain desired engine RPM.

The ECU 1 has the ability to sense through employment of the TPS and RPM sensors when such additional loads are placed on the engine C and to increase the fuel delivered to the engine cylinders. Specifically, the ECU firmware includes a two dimensional fuel map for the master cylinder and the slave cylinder. As noted previously, the two dimensions on the map are throttle position sensor (TPS) vertically and RPM horizontally. The ECU will detect any change in TPS which would indicate an attempt to increase the RPM of the engine. If, after an adjustment to the TPS, there is no detected increase in the engine RPM, the ECU firmware will conclude that an extra load has been placed upon the engine. To compensate for this additional load, the ECU 1 will compensate by adjusting the fuel delivery to each cylinder to enrich the air fuel mixture. The ECU 1 does this by increasing the PWM to lengthen the time duration of the of the fuel valve 3 duty cycle and increase the amount of fuel delivered to the cylinders. The richer fuel mixture will allow the engine to counteract the tendency of the engine C to slow down because of the extra load placed on the engine.

In a similar manner, the ECU 1 will also compensate for any decrease in the loading placed on the engine C. When the ECU 1 detects a TPS adjustment meant to reduce the RPM of the engine, the ECU 1 will examine the RPM to see if an actual RPM reduction occurs. If there is no reduction in RPM, the ECU 1 responds by shortening the PWM to decrease the duration of the time the fuel valve 3 is operated, thereby reducing the amount of fuel delivered to the cylinders. The leaner fuel mixture will allow the engine to counteract the tendency of the engine C to speed up because of the reduced load on the engine.

B. General Operation of the Engine Using the EFR System

1. Priming Mode.

When the internal combustion engine C is started, power is supplied to the ECU 1 and the ECU 1 is initialized within about 100 microseconds. The ECU 1 then initiates a ten second fuel pump priming operations that runs the fuel pump 2 for about ten seconds, while waiting for the ignition spark sensor 4 to indicate a spark plug 4B has been fired. This priming operation acts to prime the fuel pump 2 to get all the air out of the fuel pump 2 and to move fuel to the fuel valve 3. If the ECU 1 does not detect a spark within the ten second priming period, the ECU 1 disconnects power to the fuel pump 2 and the flow of fuel is stopped.

If the ECU 1 detects an ignition current sent to the spark plug 4B, the ECU 1 immediately sends power to the fuel valve 3 to execute a primer timing function. The primer timing function delivers large amounts of fuel just after the detection of an ignition spark to assist the engine during start-up. The primer timing operation ends upon one of two conditions. Priming timing expires when a certain internal ignition count is reached, or it expires when the engine C is running at 1000 RPM or more as determined by the evaluation of the signals provided by the ignition spark detection sensor 4. If neither of these conditions are fulfilled, the ECU interprets this failure as an engine failure of some type and will disconnect power to both the fuel pump 2 and the fuel valve 3.

It should also be noted that in the priming mode, the ECU 1 also examines the voltage available from the on-board battery used with the engine C. The ECU 1 does this by examining the voltage being supplied to the ECU 1 when power is first provided to the ECU 1 at engine start up. Once the battery voltage is determined, the ECU 1 compensates for a low battery voltage by increasing the duty cycle of the fuel pump 2 to accelerate the increase of fuel pressure in the fuel delivery system. The fuel pump 2 duty cycle is increased by broadening the pulse width of the power sent to the fuel pump 2 by the ECU 1. When the engine C starts and the battery is charged sufficiently to provide 13 VDC or more to the ECU 1, the pulse band width to the fuel pump 2 reverts to the band width as determined by other engine C operating parameters. This ability to essentially "bump start" the fuel delivery system is important in very cold temperatures where the battery may have only enough electrical energy for a few moments of cranking.

In another embodiment of the present invention, the amount of fuel delivered to the fuel system is not determined by the duration of time the fuel pump 2 operates, but is determined by the amount of voltage supplied to the fuel valve 3. In that manner, the amount of fuel delivered to the fuel system is dependent upon the amount of voltage the ECU 1 supplies to the fuel valve 3.

2. Cold Start Mode.

When the ECU 1 has determined that the engine C has been primed as described above, the ECU 1 will switch to a starting mode. Based on the current conditions of the engine C, the ECU 1 will initiate either a cold start mode, a warm start mode, or a hot start mode. The determination of which start mode to enter is determined by the engine temperature sensor 6 and the temperature values stored in the ECU 1. For example, the cold start mode may be initiated by the ECU 1 based upon a value of about 60° F. or less. Upon detection of such temperatures, the ECU 1 will operate the fuel pump 2 and the fuel valve 3 to deliver larger amounts of fuel to choke the engine C. When the ECU 1 reaches the temperature value established as normal operating temperature, the ECU 1 switches from the cold start mode and begins managing the fuel system in the regular run mode.

It is noted that the ECU 1 is also equipped with the ability to operate the cold start mode for a specific time rather than depending upon a specific temperature range supplied by the engine temperature sensor 6. For example, while in the start mode, a internal timer can be set to a specific time such as 90 seconds. Under this scenario, the cold start mode will continue until the expiration of the 90 second time frame. During that 90 second time, the ECU 1 ramps down rate of fuel delivery to the engine C to ensure smooth transitions from the engine start mode to a regular run mode. FIG. 8 shows an example of a map for choking the engine C during startup and the subsequent ramping up or down of the fuel flow needed when starting the engine C.

3. Regular Run Mode.

When the ECU 1 has completed its start mode, the ECU 1 switches into a regular run mode. In the regular run mode, the ECU 1 manages the fuel system by using the multi-dimensional maps identified above based primarily upon the TPS position and the engine RPM.

In addition to the ECU's dependence upon the detected TPS and RPM values, there is also a two-delay function including a delay for the master cylinder and a delay for the slave cylinder. The purpose of these delays is to control the fuel delivery system when there is a need to release the fuel from the fuel valve 3 to enter a specific engine cylinder. The delay is based on the detection of the ignition spark by the ignition spark sensor 4, the ignition spark acting as the baseline value for the operation of the ECU 1. The moment of the detection of the ignition spark is set as baseline zero for the ECU 1 and all delays in the operation of the fuel valve 2 are based upon that moment. When a delay is needed for either the master cylinder or the slave cylinder, there can either be a delay of time added to the slave cylinder or an addition of time added to the master cylinder. In all cases, the time duration is the duration of time that the fuel valve 3 is open and that duration of time is at some specific time value in relation to the moment of ignition spark detection. (See FIG. 6 and FIG. 7.) All of these computations are made within the main processing loop of the ECU firmware. (See FIG. 5.)

During regular run mode, the ECU also compensates for variations in the intake air temperature. For example, if the multidimensional fuel maps of the ECU 1 are set to recognize an optimum operation air intake temperature of 70° F. and the air intake temperature is in this range, the ECU 1 will not make any compensation in the fuel valve 3 durations or delays. However, if the air intake temperature is colder than 70° F., the duration and timing of the fuel valve 3 will be adjusted to add more fuel to the respective cylinders. The ECU can be set to increase the durations in the entire multidimensional fuel map by a specific percentage based upon the amount the air intake temperature is lower than 70° F. (See FIG. 11.)

In a similar manner, if the air intake temperature is higher than 70° F., the ECU 1 can be programmed to reduce the amount of fuel being supplied to the individual cylinders by reducing the duration times for operating the fuel valve 3. In this manner, the ECU 1 is capable of making a wide range of adjustments in the fuel delivery system predicate upon variances in the air intake temperature.

3. Acceleration/Deceleration Operation.

During engine operation, the engine RPM may accelerate and decelerate. When this occurs, the ECU 1 compensates for the changing fuel needs of the engine. In particular, the ECU 1 contains an acceleration/deceleration set up table. FIG. 12 shows an example of the values in the acceleration/deceleration table. This table is used to enrich the fuel mixture during engine acceleration, and to lean the fuel mixture during engine deceleration. The function of the compensation is to provide a smooth transition during rapid changes in the engine RPM.

The acceleration/deceleration set up table is, in essence, an acceleration and deceleration menu for the fuel pump 2 and fuel valve 3. The table works on percentages by adding or decreasing the values in the TPS/RPM table by a certain percentage based upon the rate of acceleration or deceleration. For example, the ECU adds a percentage to the original fuel map values during acceleration to increase the amount fuel delivered, or can subtract a percentage from the original fuel map values during deceleration to decrease the amount of fuel delivered. All of these computations again occur during the execution of the main processing loop within the ECU firmware. (See FIG. 5.)

4. Shutdown Mode.

Shutdown of an engine C under the control of an EFR system A is generally the same as for any standard internal combustion engine. Specifically, a cut-off switch is positioned to either cutoff the current flowing to the high tension spark plug wire 4A or the switch acts to ground the high tension ignition wire to interrupt the flow of electricity to the spark plug 4B. In either case, the ECU 1 will detect the lack of a signal from the ignition spark sensor 4 and will stop sending power to both the fuel pump 2 and the fuel pump valve 3. It will be appreciated that the full shut off of all fuel to the fuel system also prevents any fuel from entering the engine cylinder after the ignition switch is turned off. This lack of fuel prevents the engine from "dieseling" after ignition shutdown.

While the above description describes various embodiments of the present invention, it will be clear that the present invention may be otherwise easily adapted to fit any configuration where a electronic fuel regulation system A may be utilized.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

The invention claimed is:

1. An electronic fuel regulation system to control the delivery of fuel to at least one cylinder of a small internal combustion engine comprising:

a fuel pump;

a fuel valve operatively connected to the fuel pump and being capable of cycling open and closed in not more than about twelve milliseconds and having an average operating pressure between 2 and 10 psi but not exceeding about 15 psi, the maximum operating pressure for the fuel system being controlled by a fuel pressure regulator, and the operating pressure being controlled by a fuel pump a fuel valve and an electronic control unit configured to vary the duty cycle of the fuel valve, and the fuel pump, the fuel valve having a body, a plunger reciprocally positioned within the body and the fuel valve having a cap connected to an end of the body, the cap having a seat positioned within the body and facing the plunger and the cap having an integrated fuel rail positioned outside of the body, the plunger reciprocally contacting the seat during the cycling of the fuel pump;

an air intake manifold, the air intake manifold having a mounting system configured to operatively connect with the integral fuel rail so as to mount the fuel valve into the air intake manifold;

a throttle position sensor capable of detecting the position of a throttle on the small internal combustion engine and being capable of sending a throttle position sensor signal;

at least one ignition sensor having the ability to detect transmittal of a momentary electrical current used to ignite at least one spark plug on the small internal combustion engine and capable of sending at least one ignition sensor signal;

an electronic control unit configured to drive the fuel pump and the fuel valve in a fuel delivery system for the small internal combustion engine, wherein the electronic control unit has the ability of accepting the throttle position sensor signal and the at least one ignition sensor signal, and further having the ability to continuously monitor the operation of the small internal combustion engine to adjust operation of the fuel pump and the fuel valve at the fuel system average operating pressure of less than about 15 psi to increase the operating efficiency of the small internal combustion engine while the fuel pressure regulator maintains such maximum operating pressure.

2. The electronic fuel regulation system of claim 1 wherein the electronic control unit is microprocessor based.

3. The electronic fuel regulation system of claim 1 wherein the plunger includes a conical end and the seat is configured to matchingly accept the conical end free from a seal between the conical end and the seat.

4. The electronic fuel regulation system of claim 2 further comprising an air intake temperature sensor capable of detecting a temperature of an air stream entering the air intake manifold of the internal combustion engine and sending an air intake temperature signal.

5. The electronic fuel regulation system of claim 4 further comprising an engine temperature sensor capable of detecting an operating temperature of the small internal combustion engine and sending an engine operating temperature signal.

6. The electronic fuel regulation system of claim 5 wherein the electronic control unit is capable of detecting a voltage from a battery used to provide electrical power to the small internal combustion engine and is further capable of adjusting the cycling of the fuel pump to compensate for the voltage variation detected from the battery.

7. The electronic fuel regulation system of claim 6 wherein the electronic control unit includes a set of firmware that controls fuel delivery by a cycling of the fuel valve in coordination with the firing of the at least one spark plug on the small internal combustion engine, the firmware being capable of monitoring the signal from the at least one ignition sensor and determining an engine RPM of the small internal combustion engine.

8. The electronic fuel regulation system of claim 7 wherein a fuel valve duration is specified under a two-dimensional fuel valve duration look-up table within the electronic control unit, the two-dimensional fuel valve duration look-up table being indexed by the throttle position sensor signal and the engine RPM, and wherein a fuel valve delay is specified in a fuel valve delay look-up table.

9. The electronic fuel regulation system of claim 8 wherein the fuel valve delay and the fuel valve duration for the fuel valve is automatically adjusted by the electronic control unit based on a choke need for the small internal combustion engine.

10. The electronic fuel regulation system of claim 8 wherein the fuel valve delay and the fuel valve duration for the fuel valve is automatically adjusted by the electronic control unit based on the air intake temperature signal.

11. The electronic fuel regulation system of claim 8 wherein the fuel valve delay and the fuel valve duration of the fuel valve is automatically adjusted by the electronic control unit based on one of either an acceleration or a deceleration of the small internal combustion engine.

12. The electronic fuel regulation system of claim 8 wherein the fuel valve delay and the fuel valve duration of the fuel valve is automatically adjusted by the electronic control unit based on a change in the load placed on the small internal combustion engine.

13. The electronic fuel regulation system of claim 12 wherein the electronic control unit is capable of automatically detecting a power/intake stroke of the small internal combustion engine.

14. The electronic fuel regulation system of claim 13 wherein the electronic control unit further comprises the ability to change the values of the two-dimensional look-up table to match a particular geographic location in which the small internal combustion engine will be operated.

15. The electronic fuel regulation system of claim 14 wherein the microprocessor of the electronic control unit includes a non-volatile memory for algorithm and storage of at least one electronic map, a set of signal conditioning circuits, a fuel valve driver circuit, and a fuel pump driver circuit.

16. The electronic fuel regulation system of claim 15 wherein the microprocessor of the electronic control unit further comprises an 8-bit microcontroller having an 8 MHz Hc08 core, 16 KB of in-system programmable FLASH memory, 768 bytes of RAM, a serial communications controller, a seven channel ten-bit analog to digital converter, at least four programmable timers/counters, a six channel pulse width modulation ability, an RS 232 serial communications port, and a software generated hours meter.

17. The electronic fuel regulation system of claim 16 wherein the microprocessor of the electronic control unit includes a non-volatile storage of a set of tuning parameters and an I²C bus to a 512 byte electronically erasable programmable read-only memory.

18. The electronic fuel regulation system of claim 17 wherein the set of firmware in the electronic control unit includes a first firmware module having software routines to perform a set of engine parameter calculations including at least one of either an engine temperature calculation, an air temperature compensation calculation, a battery voltage calculation, calculation of a set of parameters for fuel pump pulse width modulation, calculation of an RPM of the small internal combustion engine, a fuel system pressure calculation, an engine throttle position calculation, calculation of a choke need for the small internal combustion engine, an engine acceleration/deceleration calculation, the fuel valve delay calculation, and the fuel valve duration calculation.

19. The electronic fuel regulation system of claim 18 wherein the set of engine parameter calculations further includes computation of the fuel valve delay between receipt of the at least one ignition sensor signal and a delivery of fuel to at least one cylinder of a small internal combustion engine.

20. The electronic fuel regulation system of claim 19 wherein the set of engine parameter calculations includes include a set of computations of the fuel valve duration for the time the fuel valve is kept open.

21. The electronic fuel regulation system of claim 20 wherein the set of engine parameter calculations is performed separately for each of the at least one cylinder of the small internal combustion engine.

22. The electronic fuel regulation system of claim 21 wherein the fuel valve delays in the set of engine parameter calculations are taken from a fuel valve delay look-up table.

23. The electronic fuel regulation system of claim 22 wherein the fuel valve delays in the set of engine parameter calculations have the ability to be adjusted based upon a set of current operating conditions of the small internal combustion engine.

24. The electronic fuel regulation system of claim 23 wherein the set of firmware of the electronic control unit includes a second firmware module having software routines that control the seven channel ten-bit analog to digital converter in the microprocessor, the microprocessor having analog inputs for the throttle position sensor signal, the air intake temperature signal, the engine operating temperature signal, and a fuel system pressure signal.

25. The electronic fuel regulation system of claim 24 wherein the set of firmware of the electronic control unit includes a third firmware module having software routines to store and retrieve a set of third firmware module parameters to and from the electronically erasable programmable read-only memory.

26. The electronic fuel regulation system of claim 25 wherein the set of third firmware module parameters include a set of values from the fuel valve delay look up table, a set of values from the two-dimensional fuel valve duration look-up table, a set of choke parameters, a calibration of the throttle position sensor signal, and a value from the hours meter.

27. The electronic fuel regulation system of claim 26 wherein the set of firmware of the electronic control unit includes a fourth firmware module having software routines to control a set of clock and data lines necessary to operate a I²C serial bus in the microprocessor of the electronic control unit.

28. The electronic fuel regulation system of claim 27 wherein the set of firmware of the electronic control unit includes a fifth firmware module having software routines to initialize and control a pulse width output from the microprocessor of the electronic control unit.

29. The electronic fuel regulation system of claim 28 wherein the set of firmware of the electronic control unit includes a sixth firmware module having software routines to initialize, send, and receive data on an RS 232 serial communications interface of the microprocessor of the electronic control unit.

30. The electronic fuel regulation system of claim 29 wherein the set of firmware of the electronic control unit includes a seventh firmware module having software routines to initialize and control the at least four timers/counters of the microprocessor.

31. The electronic fuel regulation system of claim 30 wherein the set of firmware of the electronic control unit includes an eighth firmware module having software routines to perform a software 16×16 unsigned multiply function and a 32×16 unsigned divide function.

32. The electronic fuel regulation system of claim 31 wherein the set of firmware of the electronic control unit includes a ninth firmware module having software routines that contain a reset start point, a main processing loop to continuously monitor and control the entire operation of all firmware modules of the electronic control unit, a reset vector table for the entire set of firmware, and a set of routines to retrieve and update the hours meter to and from the EEPROM every about 0.10 hour interval.

33. The electronic fuel regulation system of claim 32 wherein the set of firmware of the electronic control unit includes a tenth firmware module having software routines to enable communication with an engine monitoring software via the RS 232 serial communications port of the microprocessor of the electronic control unit.

34. The electronic fuel regulation system of claim 33 wherein the set of firmware of the electronic control unit includes an eleventh firmware module containing all RAM and FLASH memory definitions, and a set of register definitions for the microprocessor of the electronic control unit.

35. The electronic fuel regulation system of claim 34 wherein the set of firmware of the electronic control unit includes a twelfth firmware module containing a look-up table used to convert the analog input from at least one pressure sensor into pounds per square inch.

36. The electronic fuel regulation system of claim 35 wherein the set of firmware of the electronic control unit includes a thirteenth firmware module containing all of the RAM variable storage definitions used by the firmware of the electronic control unit.

37. The electronic fuel regulation system of claim 36 wherein the set of firmware of the electronic control unit includes a fourteenth firmware module containing a set of default values for the fuel valve delay look-up table, the fuel valve duration two-dimensional look-up tables, an acceleration/deceleration table, an engine choke table, a fuel pump compensation table, a battery compensation look-up table, a set of values for priming the fuel system, and a set of values for calibration of the throttle position sensor.

38. The electronic fuel regulation system of claim 37 wherein the set of firmware of the electronic control unit includes a fifteenth firmware module containing a conversion look-up table used to convert the air intake temperature sensor signal and the engine operating temperature signal from analog signals into temperatures in degrees Centigrade.

39. The electronic fuel regulation system of claim 38 wherein the set of firmware of the electronic control unit includes a sixteenth firmware module containing miscellaneous constant definitions used by the firmware of the electronic control unit.

40. The electronic fuel regulation system of claim 39 wherein the electronic control unit includes at least one electronic map that is used by the electronic control unit to optimize the operation of the small internal combustion engine.

41. The electronic fuel regulation system of claim 40 wherein the electronic control unit includes a priming mode in which, during startup of the small internal combustion engine, the fuel pump and the fuel valve are primed for one of either a period of about ten seconds or until the electronic control unit receives an ignition sensor signal.

42. The electronic fuel regulation system of claim 41 wherein the electronic control unit includes a priming timing function which delivers large amounts of fuel to the at least one cylinder of the small internal combustion engine just after the electronic control unit receives the at least one ignition sensor signal, the priming function being discontinued when one of either a preset count of the ignition sensor signals is reached or the engine RPM is at least 1000, and wherein the electronic control unit stops driving the fuel pump and the fuel valve if the preset count of at least one of the ignition sensor signals is reached before the engine RPM reaches 1000.

43. The electronic fuel regulation system of claim 42 wherein the electronic control unit includes the ability generate an increase in the cycling rate of the fuel pump to increase the fuel pressure in the electronic fuel regulation system when the electronic control unit senses the voltage of the small internal combustion engine battery is below a preset value, the increase in cycling rate of the fuel pump being accomplished by broadening the pulse width of the power sent to the fuel pump.

44. The electronic fuel regulation system of claim 43 wherein the electronic control unit an acceleration/deceleration mode that compensates for changing fuel requirements of the small internal combustion engine by providing a smooth transition during rapid changes in engine RPM, the smooth transition being accomplished during acceleration by an addition to the values in the fuel valve duration two-dimensional look-up table, and during deceleration by during acceleration by a subtraction from the values in the fuel valve duration two-dimensional look-up table, the amount of either the addition or the subtraction being determined by the electronic control unit based upon the upon one of either a rate of engine acceleration or a rate of engine deceleration.

45. The electronic fuel regulation system of claim 44 wherein the at least one electronic map is designed for use with a V-twin internal combustion engine.

46. The electronic fuel regulation system of claim 45 wherein one of the two cylinders of the V-twin internal combustion engine is designated the "master cylinder" and the other of the two cylinders is designated the "slave cylinder," and wherein the at least one electronic map comprises at least two sets of multi-dimensional maps, one for the master cylinder and one for the slave cylinder.

47. The electronic fuel regulation system of claim 46 wherein each of the at least two sets of multi-dimensional maps contain two dimensions, with the vertical dimension being the position of a throttle position switch as detected by the throttle position sensor and the horizontal dimension being the engine RPM.

48. The electronic fuel regulation system of claim 47 wherein the throttle position is indicated by the percentage that the throttle position is in related to its maximum open position.

49. The electronic fuel regulation system of claim 48 wherein for each intersection of the two dimensions in each of the at least two sets of multi-dimensional maps there is a specific time duration that represents the amount of time in milliseconds that the fuel valve will be open to allow fuel to enter the air intake manifold.

50. The electronic fuel regulation system of claim 49 wherein each of the master cylinder and slave cylinder also has a fuel delay angle table, the fuel delay angle acting to determine the exact time the fuel valve is opened in relation to the signal received from the at least one ignition sensor.

51. The electronic fuel regulation system of claim 50 wherein each of the at least two sets of multi-dimensional maps is variable in that the specific time duration at each intersection of the two dimensions of each of the at least two sets of multi-dimensional maps is adjustable by a processing subroutine that revises the specific time duration based on inputs to the microprocessor.

52. The electronic fuel regulation system of claim 51 wherein the electronic control unit is capable of determining a change in the load placed on the small internal combustion engine.

53. The electronic fuel regulation system of claim 52 wherein the change in the load placed on the small internal combustion engine is determined by the electronic control unit's evaluation of a change in the throttle position sensor signal in relation to a change in the engine RPM.

54. The electronic fuel regulation system of claim 53 wherein a decrease in the load placed on the internal combustion engine is determined when a change in the throttle position sensor signal indicating an intended reduction of the engine RPM is not accompanied by a related decrease in the engine RPM.

55. The electronic fuel regulation system of claim 54 wherein an increase in the load placed on the internal combustion engine is determined when a change in the throttle position sensor signal indicating an intended increase of the engine RPM is not accompanied by a related increase in the engine RPM.

56. The electronic fuel regulation system of claim 55 wherein the electronic control unit has the ability to independently lean or enrich the air fuel mixture of either the master cylinder or the slave cylinder by varying the values in the fuel valve duration two-dimensional look-up table based upon a specific set of operating characteristics for a specific engine.

57. In combination with a small internal combustion engine having less than five cylinders, an electronic fuel regulation system comprising a fuel regulator for limiting the fuel pressure of the fuel system, a fuel valve being capable of cycling open and closed in not more than about twelve milliseconds and having an on/off response time of less then two milliseconds, the fuel valve having a body, a plunger reciprocally positioned within the body and having a cap connected to an end of the body, the cap having a seat positioned within the body and facing the plunger and having an integrated fuel rail positioned outside of the body, the plunger reciprocally contacting the seat during the cycling of the fuel valve, a fuel pump operatively connected to the fuel valve, and an electronic control unit, the electronic control unit being capable of managing a fuel delivery system for the small internal combustion engine operating at an average system pressure within the fuel regulator pressure limit of less than about 15 psi by controlling and varying the pulse width of the electrical power transmitted from the electronic control unit to drive both the fuel pump and the fuel valve, the maximum operating pressure limit for the fuel system being controlled by the cycling of the fuel pump by the electronic control unit in a range between approximately 2 and 10 psi, the control and variation of pulse widths being accomplished by a set of firmware and at least one electronic map stored within the electronic control unit, the set of firmware controlling and varying the pulse widths of the fuel pump and the fuel valve based upon a set of signals sent from a set of sensors, the set of sensors including at least an intake air temperature sensor, an engine operating temperature sensor, a throttle position sensor, and at least one ignition sensor, the electronic control unit includes a priming timing function which delivers large amounts of fuel to the at least one cylinder of the small internal combustion engine just after the electronic control unit receives the at least one ignition sensor signal, the priming function being discontinued when one of either a preset count of the ignition sensor signals is reached or the engine RPM is at least 1000, and wherein the electronic control unit stops driving the fuel pump and the fuel valve if the preset count of at least one of the ignition sensor signals is reached before the engine RPM reaches 1000.

58. In a small internal combustion engine having less than five cylinders, the improvement comprising the installation of an electronic fuel regulation system onto the small internal combustion engine, the electronic fuel regulation system comprising a fuel valve being capable of cycling open and closed in not more than about twelve milliseconds, a fuel pump, the pressure for the fuel system being controlled in a range of approximately 3 to 6 psi by a cycling of the fuel pump and an electronic control unit, the electronic control unit being capable of managing a fuel delivery system for the small internal combustion engine by controlling in a range of approximately 3 to 6 psi and varying the pulse width of the electrical power transmitted from the electronic control unit to drive both the fuel pump and the fuel valve, the control and variation of pulse widths being accomplished by a set of firmware and at least one electronic map stored within the electronic control unit, the set of firmware controlling and varying the pulse widths of the fuel pump and the fuel valve based upon a set of signals sent from a set of sensors, the set of sensors including at least an intake air temperature sensor, an engine operating temperature sensor, a throttle position sensor, and at least one ignition sensor, the electronic control unit includes a cold start mode that chokes the engine with extra fuel by broadening the pulse widths of the power sent to drive the fuel pump and the fuel valve to thereby deliver more fuel to the cylinder of a internal combustion engine, the priming function being discontinued when one of either a preset count of the ignition sensor signals is reached or the engine RPM is at least 1000, and wherein the electronic control unit stops driving the fuel pump and the fuel valve if the preset count of at least one of the ignition sensor signals is reached before the engine RPM reaches 1000.

59. The process of regulating the fuel delivery in a small internal combustion engine having a fuel delivery system comprising the steps of:
  providing a fuel pump;
  providing a fuel valve being capable of cycling open and closed in not more than about twelve milliseconds;
  providing an air intake manifold for a small internal combustion engine, the air intake manifold having a mounting system capable of mounting the fuel valve onto the air intake manifold;
  providing a throttle position sensor capable of detecting the position of a throttle on the small internal combustion engine and being capable of sending a throttle position sensor signal;
  providing at least one ignition sensor having the ability to detect transmittal of a momentary electrical current used to ignite at least one spark plug on the small internal combustion engine and capable of sending at least one ignition sensor signal;

providing an electronic control unit capable of simultaneously driving the fuel pump and the fuel valve and of accepting the throttle position sensor signal and the at least one ignition sensor signal, the maximum operating pressure for the fuel system being controlled by a cycling of the fuel pump by the electronic control unit;

using the electronic control unit to monitor the operation of the small internal combustion engine to varying the operation of the fuel pump and the fuel valve to increase the operating efficiency of the small internal combustion engine wherein the average operating pressure of the fuel system between 2 and 10 psi and less than about 15 psi, the electronic control unit including a cold start mode that chokes the engine with extra fuel by broadening the pulse widths of the power sent to drive the fuel pump and the fuel valve to thereby deliver more fuel to the cylinder of the internal combustion engine the priming function being discontinued when one of either a preset count of the ignition sensor signals is reached or the engine RPM is at least 1000, and wherein the electronic control unit stops driving the fuel pump and the fuel valve if the preset count of at least one of the ignition sensor signals is reached before the engine RPM reaches 1000.

60. An electronic fuel regulation system for small internal combustion engines comprising:

means for providing fuel intermittently to at least one cylinder of the small internal combustion engine, said means including a valve being capable of completing one cycle of starting and stopping the fuel flow to the small internal combustion engine at rate of less than 12 milliseconds per each cycle;

means for pumping a quantity of fuel from a fuel tank and into a fuel delivery system for the small internal combustion engine at an average fuel delivery system operating pressure of between approximately 2 and 10 psi;

means for detecting at least one characteristic of an environment in which the small internal combustion engine is operating, said means including the ability to generate a signal corresponding to the at least one characteristic of the environment;

means for detecting a least one operating characteristic of the small internal combustion engine and the fuel delivery system for the small internal combustion engine, said means including the ability to generate a signal corresponding to the at least one operating characteristic of the small internal combustion engine; and means for providing a source of power to drive the means for providing fuel intermittently to at least one cylinder of a small internal combustion engine and to drive the means for pumping a quantity of fuel from a fuel tank and into a fuel delivery system for the small internal combustion engine, said means for providing a source of power being capable of modulating a pulse width of the power in response to at least one of either the at least one signal corresponding to the at least characteristic of the environment or the at least one operating characteristic of the small internal combustion engine, including a cold start mode that electronically chokes the engine with extra fuel by broadening the pulse widths of the power sent to drive the means for pumping and the means for providing fuel to thereby deliver more fuel to the cylinder of a internal combustion engine the priming function being discontinued when one of either a preset count of the ignition sensor signals is reached or the engine RPM is at least 1000, and wherein the electronic control unit stops driving the fuel pump and the fuel valve if the preset count of at least one of the ignition sensor signals is reached before the engine RPM reaches 1000.

61. The electronic fuel regulation system of claim 60 wherein the means for providing fuel intermittently to at least one cylinder of a small internal combustion engine comprises a fuel valve having an electrical solenoid.

62. The electronic fuel regulation system of claim 61 wherein the fuel valve has a body, a plunger reciprocally positioned within the body and the fuel valve having a cap connected to an end of the body, the cap having a seat positioned within the body and facing the plunger and the cap having an integrated fuel rail positioned outside of the body, the plunger reciprocally contacting the seat during cycling of the means for pumping.

63. The electronic fuel regulation system of claim 61 wherein the means for detecting at least one characteristic of an environment in which the small internal combustion engine is operating comprises an air intake temperature sensor.

64. The electronic fuel regulation system of claim 63 wherein the means for detecting a least one operating characteristic of the small internal combustion engine and the fuel delivery system for the small internal combustion engine comprises at least one of either a throttle position sensor generating a throttle position signal, an engine operating temperature sensor generating an engine operating temperature signal, or at least one ignition sensor generating at least one ignition sensor signal.

65. The electronic fuel regulation system of claim 64 wherein the means for providing a source of power to drive the means for providing fuel intermittently to at least one cylinder of the small internal combustion engine and to drive the means for pumping a quantity of fuel from a fuel tank and into a fuel delivery system for the small internal combustion engine comprises an electronic control unit, the electronic control unit comprising a set of firmware, at least on electronic map, and means for receiving the signal corresponding to the at least one characteristic of the environment and the signal corresponding to the at least one operating characteristic of the small internal combustion engine.

66. The electronic fuel regulation system of claim 65 wherein the electronic control unit comprises an ability to vary the power to drive the means for providing fuel intermittently to at least one cylinder of the small internal combustion engine and to drive the means for pumping a quantity of fuel from a fuel tank and into a fuel delivery system for the small internal combustion engine comprises an electronic control unit, the ability to vary the power being accomplished by varying the pulse width of the power.

67. The electronic fuel regulation system of claim 66 wherein the electronic control unit further comprises a priming timing function which delivers large amounts of fuel to at least one cylinder of the small internal combustion engine just after the electronic control unit receives the at least one ignition sensor signal, the priming function being discontinued when one of either a preset count of the ignition sensor signals is reached or the engine RPM is at least 1000, and wherein the electronic control unit stops providing power to drive the fuel pump and to drive the fuel valve if the preset count of the at least one ignition sensor signals is reached before the engine RPM reaches 1000.

68. The electronic fuel regulation system of claim 67 wherein the electronic control unit further comprises an ability generate an increase in the cycling rate of the fuel pump to increase the fuel pressure in the electronic fuel regulation system when the electronic control unit senses a voltage of a battery for the small internal combustion engine is below a preset value, the increase in cycling rate of the fuel pump being accomplished by broadening the pulse width of the power sent to the fuel pump.

69. The electronic fuel regulation system of claim 68 wherein the electronic control unit further comprises a cold start mode that chokes the engine with extra fuel by broadening the pulse widths of the power sent to drive the fuel pump and the fuel valve to thereby deliver more fuel to the at least one cylinder of the internal combustion engine, the cold start mode continuing until one of either a preset engine operating temperature is reached or a preset cold start operating time is reached.

70. The electronic fuel regulation system of claim 69 wherein the electronic control unit further comprises an acceleration/deceleration mode that compensates for changing fuel requirements of the small internal combustion engine by providing a smooth transition during rapid changes in engine RPM, the smooth transition being accomplished during acceleration by an addition to the values in a fuel valve duration two-dimensional look-up table, and during deceleration by during acceleration by a subtraction from the values in the fuel valve duration two-dimensional look-up table, the amount of either the addition or the subtraction being determined by the electronic control unit based upon one of either a rate of engine acceleration or a rate of engine deceleration.

71. The electronic fuel regulation system of claim 70 wherein the electronic control unit comprises at least one electronic map designed for use with a V-twin internal combustion engine.

72. The electronic fuel regulation system of claim 71 wherein one of the two cylinders of the V-twin internal combustion engine is designated the "master cylinder" and the other of the two cylinders is designated the "slave cylinder," and wherein the at least one electronic map comprise at least two sets of multi-dimensional maps, one for the master cylinder and one for the slave cylinder.

73. The electronic fuel regulation system of claim 72 wherein each of the at least two sets of multi-dimensional maps contain two dimensions, with the vertical dimension being the position of a throttle position switch as detected by the throttle position sensor and the horizontal dimension being the engine RPM.

74. The electronic fuel regulation system of claim 73 wherein the throttle position is indicated by the percentage that the throttle position is in related to its maximum open position.

75. The electronic fuel regulation system of claim 74 wherein for each intersection of the two dimensions in each of the at least two sets of multi-dimensional maps there is a specific time duration that represents the amount of time in milliseconds that the fuel valve will be open to allow fuel to enter an air intake manifold of the small internal combustion engine.

76. The electronic fuel regulation system of claim 75 wherein each of the master cylinder and slave cylinder also has a fuel delay angle table, the fuel delay angle acting to determine the exact time the fuel valve is opened in relation to the at least one ignition signal received from the ignition sensor.

77. The electronic fuel regulation system of claim 76 wherein each of the at least two sets of multi-dimensional maps is variable in that the specific time duration at each intersection of the two dimensions of each of the at least two sets of multi-dimensional maps is adjustable by a processing subroutine that revises the specific time duration based on a set of inputs to the microprocessor.

78. The electronic fuel regulation system of claim 77 wherein the electronic control unit is capable of determining a change in the load placed on the small internal combustion engine.

79. The electronic fuel regulation system of claim 78 wherein the change in the load placed on the small internal combustion engine is determined by the electronic control unit's evaluation of a change in the throttle position sensor signal in relation to a change in the engine RPM.

80. The electronic fuel regulation system of claim 79 wherein a decrease in the load placed on the internal combustion engine is determined when a change in the throttle position sensor signal indicating an intended reduction of the engine RPM is not accompanied by a related decrease in the engine RPM.

81. The electronic fuel regulation system of claim 80 wherein an increase in the load placed on the internal combustion engine is determined when a change in the throttle position sensor signal indicating an intended increase of the engine RPM is not accompanied by a related increase in the engine RPM.

82. The electronic fuel regulation system of claim 81 wherein the electronic control unit has the ability to independently lean or enrich the air fuel mixture of either the master cylinder or the slave cylinder by varying the values in the fuel valve duration two-dimensional look-up table based upon a specific set of operating characteristics for a specific engine.

83. An electronic fuel regulation system to control the delivery of fuel to at least one cylinder of a small internal combustion engine comprising:
   a fuel pump;
   a fuel regulator adapted to limit the fuel pressure to less than 20 psi;
   a fuel valve being capable of cycling open and closed in not more than about twelve milliseconds, the operating pressure for the fuel system being controlled by the cycling of the fuel pump in a normal range between approximately 2 and 10 psi and optimally between 3 and 6 psi, the fuel valve having a body, a plunger reciprocally positioned within the body and the fuel valve having a cap connected to an_end of the body, the cap having a seat positioned within the body and facing the plunger and the cap having an integrated fuel rail formed with and positioned outside of the body, the plunger reciprocally contacting the seat during the cycling of the fuel pump;
   an air intake manifold for a small internal combustion engine, the air intake manifold having a mounting system configured to operatively connect with the integrated fuel rail so as to mount the fuel valve onto the air intake manifold;
   at least one sensors configured to generate a signal indicating the operating condition of said engine, the at least one sensor including at least one of either an exhaust gas temperature, a throttle position sensor capable of detecting the position of a throttle on the small internal combustion engine and being capable of sending a throttle position sensor signal, or an ignition sensor having the ability to detect transmittal of a momentary electrical current used to ignite at least one spark plug on the small internal combustion engine and capable of sending at least one ignition sensor signal;
   an electronic control unit capable of driving the fuel pump and the fuel valve in a fuel delivery system for the small internal combustion engine, wherein the electronic control unit has the ability of accepting the throttle position sensor signal and the at least one ignition sensor signal, and further having the ability to continuously monitor the operation of the small internal combustion engine to adjust operation of the fuel pump and the fuel valve to increase the operating efficiency of the small internal combustion engine.

* * * * *